(12) United States Patent
McNicol et al.

(10) Patent No.: US 8,861,977 B2
(45) Date of Patent: Oct. 14, 2014

(54) MULTIPLEXER AND MODULATION ARRANGEMENTS FOR MULTI-CARRIER OPTICAL MODEMS

(75) Inventors: John D. McNicol, Ottawa (CA); Matthew L. Mitchell, Monte Sereno, CA (US); David F. Welch, Atherton, CA (US)

(73) Assignee: Infinera Corporation, Sunnyvale, CA (US)

( * ) Notice: Subject to any disclaimer, the term of this patent is extended or adjusted under 35 U.S.C. 154(b) by 293 days.

(21) Appl. No.: 13/078,888

(22) Filed: Apr. 1, 2011

(65) Prior Publication Data

US 2012/0251119 A1 Oct. 4, 2012

(51) Int. Cl.
*H04J 14/00* (2006.01)
*H04J 14/06* (2006.01)
*H04J 14/02* (2006.01)

(52) U.S. Cl.
CPC ............ *H04J 14/02* (2013.10); *H04J 14/06* (2013.01); *H04J 14/026* (2013.01); *H04J 14/0256* (2013.01)

USPC .......................................................... 398/201

(58) Field of Classification Search
CPC .................................................. H04J 14/0298
USPC .......................................... 398/79, 182–201
See application file for complete search history.

(56) References Cited

U.S. PATENT DOCUMENTS

| 2007/0133993 A1* | 6/2007 | Yee et al. .................... 398/85 |
| 2008/0025201 A1* | 1/2008 | Geile et al. ................. 370/210 |

* cited by examiner

*Primary Examiner* — Danny Leung
(74) *Attorney, Agent, or Firm* — David L. Soltz

(57) ABSTRACT

A number of carriers are selected according to a modulation format and symbol rate to realize a superchannel having fixed capacity, for example. At a receive node, the superchannel is optically demultiplexed from a plurality of other superchannels. The plurality of carriers are then supplied to a photodetector circuit, which receives additional light at one of the optical signal carrier wavelengths from a local oscillator laser. An analog-to-digital converter (ADC) is provided in the receive node to convert the electrical signals output from the photodetector into digital form. The output from the ADC is then filtered in the electrical domain, such that optical demultiplexing of the carriers is unnecessary.

12 Claims, 17 Drawing Sheets

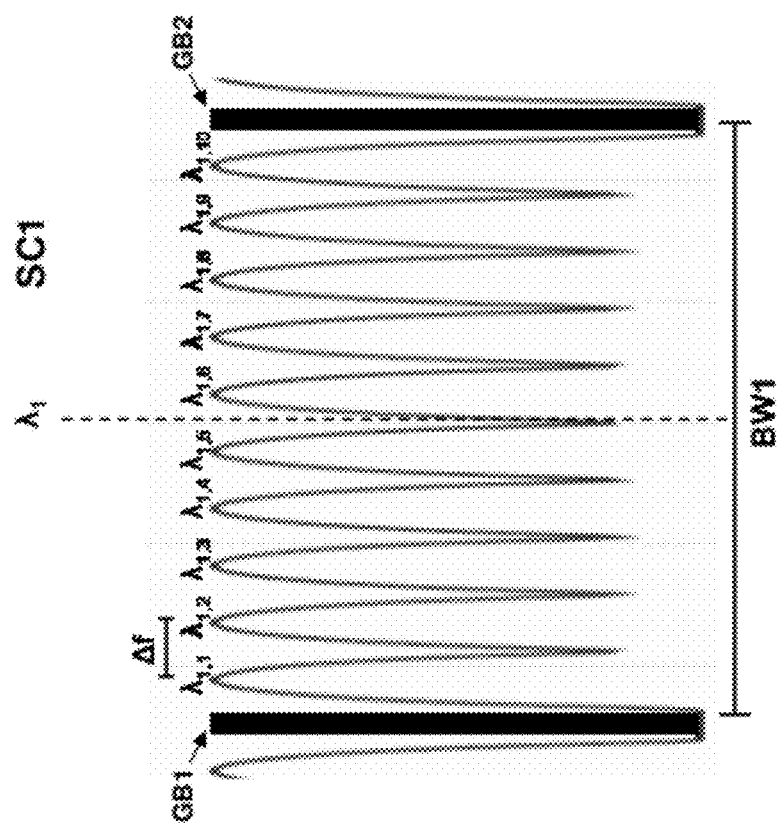

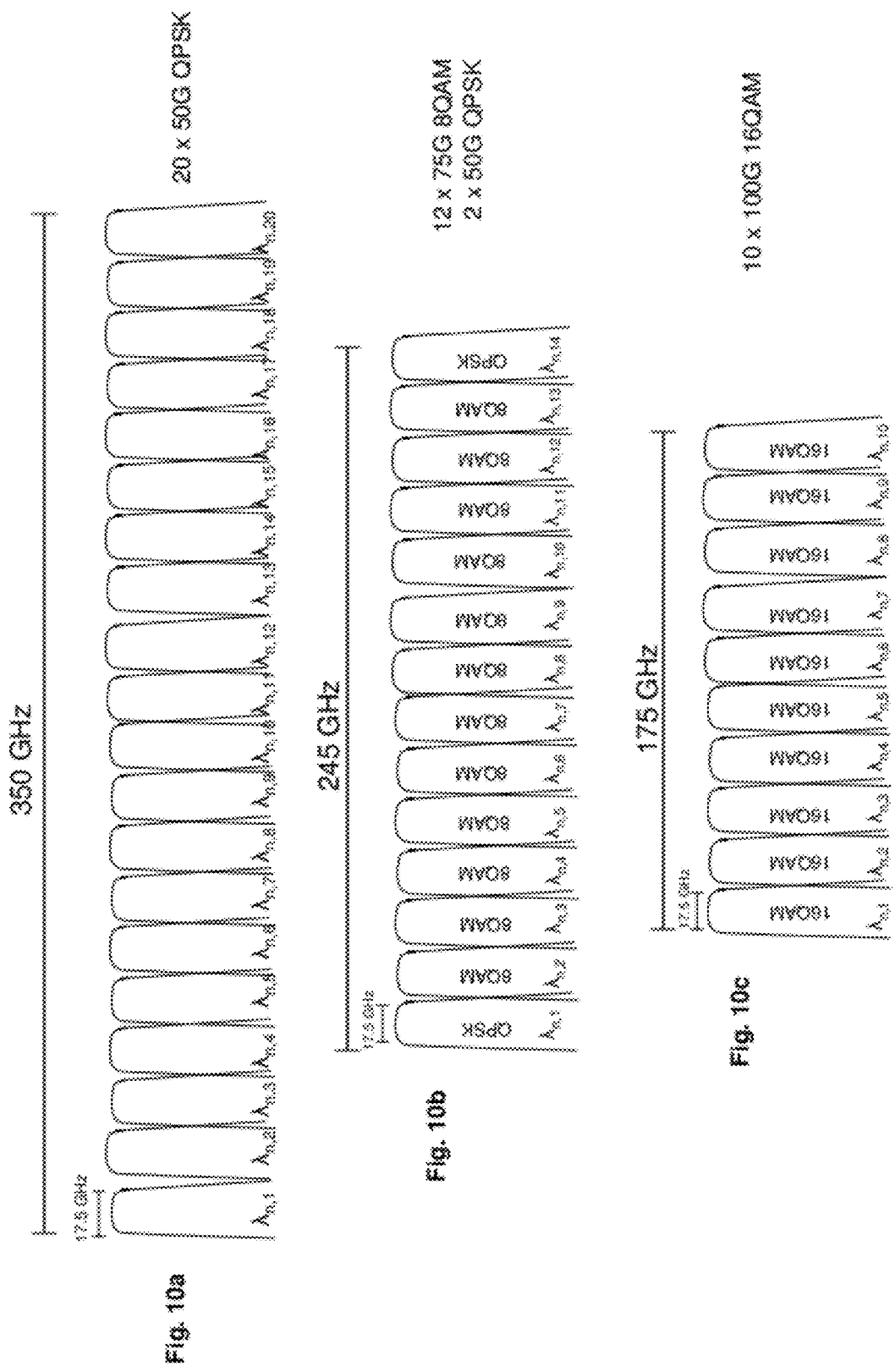

MULTIPLEXER AND MODULATION ARRANGEMENTS FOR MULTI-CARRIER OPTICAL MODEMS

BACKGROUND OF THE DISCLOSURE

Wavelength division multiplexed (WDM) optical communication systems are known in which multiple optical signals or channels, each having a different wavelength, are combined onto an optical fiber. Such systems typically include a laser associated with each wavelength, a modulator configured to modulate the optical signal output from the laser, and an optical combiner to combine each of the modulated optical signals. Such components are typically provided at a transmit end of the WDM optical communication system to transmit the optical signals onto the optical fiber. At a receive end of the WDM optical communication system, the optical signals are often separated and converted to corresponding electrical signals that are then processed further.

Known WDM optical communication systems are capable of multiplexing 40 channels at 100 GHz spacing or 80 channels at 50 GHz spacing. These WDM optical communication systems occupy an overall bandwidth of 4000 GHz. At 50 GHz channel spacing and 100 GHz channel spacing, the occupied optical fiber bandwidth or spectrum is not efficiently used. As rapid growth of the Internet continues, and new applications arise, there is an increasing demand for higher data rates provided by underlying networks, which may be supported by advances in optical communication systems. Due to the increased demand, the information carrying capacity of an optical fiber preferably should also increase. As used herein, the terms "carrier", "channel", and "optical signal" may be used interchangeably.

One method to increase the data capacity of the occupied optical fiber bandwidth is to employ higher data rate modulation formats to modulate the optical signals or channels to carry data at higher rates. Such higher rate modulation formats, however, are typically more susceptible to noise, and, therefore, may not be used in transmission of optical signals over relatively long distances. Thus, the modulation format must be chosen according to a desired reach, or distance, the transmitted channels are expected to span. Other known systems, commonly called dense wavelength-division multiplexing systems (DWDM), are capable of packing even more densely, additional channels on an optical fiber by more closely spacing the channels together, such as at 25 GHz spacing between channels. While 25 GHz channel spacing is an improvement over 50 GHz and 100 GHz spacing, further improvement is still needed to meet the demands of increased data rates. However, the dense packing of individual channels at a reduced spectral spacing between channels has lead to challenges in reliably separating the individual channels at a receive end and increases error rates for the channel due to cross-talk between the adjacent channels or cross-phase modulation effects, for example. Thus, there is a tradeoff between optical communication system performance and the number of channels to be transmitted per fiber and their spectral spacing, as well as the modulation performed on each of the channels. Accordingly, for a specific embodiment, a maximum capacity can be achieved by optimizing the above parameters, such as the chosen modulation format for the optical signal, the span of the signal and the channel spacing between adjacent signals.

Preferably, the information carrying capacity of an optical communication system should be optimized to carry a maximum amount of data over a maximum length of optical fiber. For example, individual carrier or channel spacing should be minimized according to the available technology capable of reliably transmitting and receiving such minimally spaced channels. Therefore, a greater number of channels can be packed in a given bandwidth, resulting in more efficient use of network resources and the occupied optical spectrum of the channels. Additionally, when selecting the parameters and their respective values for optimizing the optical communication system capacity, the underlying network architecture should be considered as well as the data demands of the customer.

Accordingly, increased data demands of the network drive a need to provide a plurality of minimally spaced carriers to increase optical communication system network capacity. Additionally, unique customer requirements provide a need to flexibly group the plurality of minimally spaced carriers together in blocks or "superchannels" that can be individually routed throughout the network and that can be multiplexed with other blocks of similar minimally spaced carriers. Some known systems include routers or multiplexers with limited data capacity throughput. Thus, while optimum capacity of the optical communication system is generally desired, it is also preferred that the system capacity at any network component is not exceeded. Thus, it may be advantageous to limit the maximum data capacity available on each superchannel. In such cases when the data capacity is limited, it is preferred that the occupied bandwidth of the superchannel is minimized to obtain maximum spectral efficiency of the occupied bandwidth of an optical communication system.

SUMMARY OF THE DISCLOSURE

Consistent with one aspect of the present disclosure, an apparatus comprises a first optical transmitter that is configured to supply a plurality of first optical signals, each of the plurality of first optical signals being modulated in accordance with a first modulation format. The plurality of first optical signals collectively have an associated data rate, and each of the plurality of first optical signals have a corresponding one of a plurality of first wavelengths, a highest one of the plurality of first wavelengths and a lowest one of the plurality of first wavelengths defining a first optical bandwidth. A second optical transmitter is configured to supply a plurality of second optical signals, each of the plurality of second optical signals being modulated in accordance with a second modulation format. The plurality of second optical signals collectively have the same data rate as the plurality of first optical signals, and each of the plurality of second optical signals have a corresponding one of a plurality of second wavelengths, a highest one of the plurality of second wavelengths and a lowest one of the plurality of second wavelengths defining a second optical bandwidth that is less than the first optical bandwidth. Also provided is an optical combiner configured to receive the plurality of first optical signals and the plurality of second optical signals, to combine the plurality of first optical signals and the plurality of second optical signals, and supply the plurality of first optical signals and the plurality of second optical signals to an optical communication path.

Consistent with another aspect of the present disclosure, an apparatus comprises a plurality of optical sources, each of which being configured to supply one of a plurality of optical signals, each of the plurality of optical signals having a corresponding one of a plurality of wavelengths. The apparatus also includes an optical combiner configured to receive the plurality of optical signals and supply the plurality of optical signals to an optical communication path. One of the plurality of optical signals generated by an optical source has a highest one of the plurality of wavelengths and a second one of the plurality of optical signals has a lowest one of the plurality of wavelengths, said first and second ones of the plurality of optical signals having a first modulation format and remaining ones of the plurality of optical signals having a second modulation format different than the first modulation format.

Consistent with another aspect of the present disclosure, an apparatus comprises a plurality of optical sources, each source being configured to supply one of a plurality of optical signals, each of the plurality of optical signals having a corresponding one of a plurality of wavelengths. Also provided is an optical combiner configured to receive the plurality of optical signals and supply the plurality of optical signals to an optical communication path. One of signals generated by an optical source has a highest one of the plurality of wavelengths and a second one of the plurality of optical signals has a lowest one of the plurality of wavelengths, the first one of the plurality of optical signals carrying a first plurality of symbols at a first symbol rate, and the second one of the plurality of optical signals carrying a second plurality of symbols at the first symbol rate, a third one of the plurality of optical signals having a wavelength between the highest and lowest wavelengths carrying a third plurality of symbols at a second symbol rate different than the first symbol rate.

Consistent with another aspect of the present disclosure, and apparatus comprises an optical transmitter configured to supply a plurality of optical signals from a plurality of corresponding optical sources, each of the plurality of optical signals carrying a plurality of symbols at a first symbol rate. Also provided is a plurality of modulator circuits corresponding to the plurality of optical sources, each configured to modulate a corresponding one of the plurality of optical signals in accordance with one of a plurality of modulation formats. The apparatus is configured to select a subset of the plurality of optical sources and a corresponding subset of the plurality of modulator circuits to supply a corresponding subset of the plurality of optical signals to a communication path, the subset of the plurality of optical signals being modulated according to a selected one of the plurality of modulation formats, wherein a number of the subset of the plurality of optical signals is determined based on the selected modulation format, such that the subset of optical signals collectively provides a desired data rate.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

FIG. 1*b* illustrates an optical signal or superchannel transmitted in an optical communication system consistent with aspects of the present disclosure;

FIGS. 10*a*, 10*b* and 10*c* illustrate carrier plans of a superchannel consistent with aspects of the present disclosure;

DESCRIPTION OF THE EMBODIMENTS

Figure 1A:
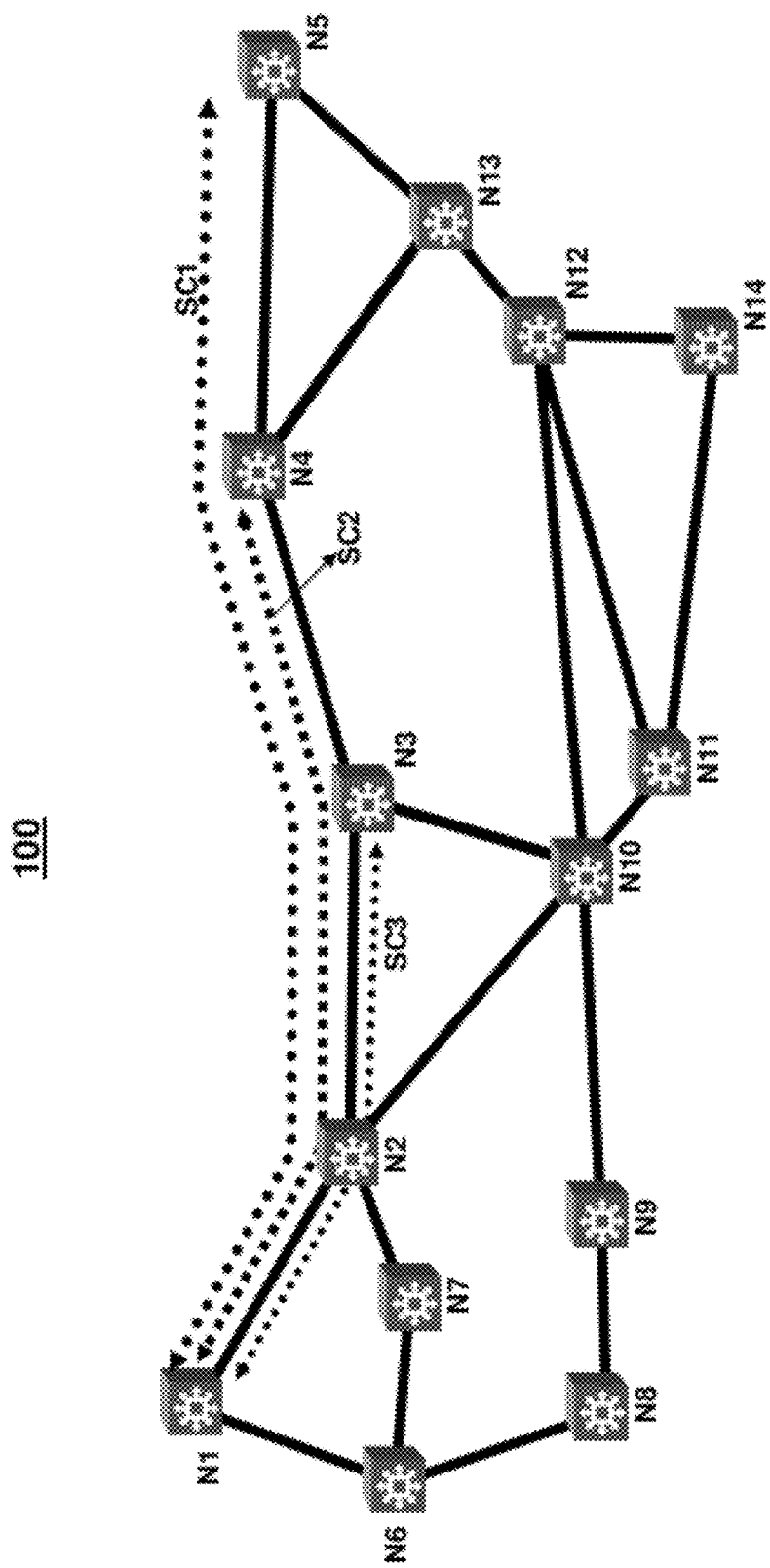
FIG. 1*a* illustrates an optical communication system consistent with aspects of the present disclosure.

Consistent with the present disclosure, data, in digital form, is received by a transmit node of an optical communication system, and converted to an analog signal by a digital-to-analog converter (DAC) to drive a modulator. The modulator, in turn, modulates light at one of a plurality of minimally spaced wavelengths in accordance with the received data and a specified modulation format. The plurality of minimally spaced wavelengths or carriers are grouped together with a fixed spacing combiner, for example, to form a superchannel. A plurality of superchannels are then multiplexed and transmitted over an optical communication path to a receive node. At the receive node, the multiplexed superchannels are demultiplexed by an optical demultiplexer and provided to a plurality of corresponding demodulators. Prior to demodulation, each superchannel may be demultiplexed using one or more filter based demultiplexers to separate the plurality of minimally spaced carriers. The demultiplexed superchannels, or carriers, may then be intradyned in a known manner by combining them with light from a plurality of local oscillators tuned to each of the minimally spaced wavelengths to provide a baseband optical signal for each carrier. The baseband optical signals are supplied to corresponding photodetectors, which, in turn, supply analog electrical signals (representative of a known "down-converted" signal), that may be amplified or otherwise processed, and provided to an analog-to-digital converter (ADC). The ADC converts the processed analog electrical signals into digital form. The output from the ADC is then further processed to generate a copy of the data supplied to the transmit node.

In particular, such processing may include filtering electrical signals generated in response to the ADC outputs in order to select data associated with one of the plurality of modulated optical signals or carriers. The exemplary detection methods enable reliable electrical filtering of the baseband optical signal for each of the individual carriers. Since filtering is carried out electronically, i.e., in the electrical domain, instead of optically, fixed optical demultiplexers are not required to demultiplex the minimally spaced carriers. Moreover, the bandwidth of the carriers may vary for each superchannel. Thus, the electrical filtering of the optical carriers may be readily tuned by circuitry in the transmit and receive nodes, such that the optical signals carrying such data may be spaced closer to one another.

Because it is desired to send data over widely varying distances, the reach requirements for each superchannel may vary. Thus, for each superchannel, it is advantageous to enable the use of a plurality of modulation formats optimized for the varying distances using a single hardware implementation at a transmitter and receiver. Further, an efficient network preferably enables flexible routing, switching and interconnection of a plurality of superchannels throughout the network according to desired performance. Because an optical network according to an aspect of this disclosure may have a limited interconnect capacity at a node in the network, it is desired that each superchannel carry a fixed maximum data capacity, for example, to ensure that that the interconnect capacity at any given time is not exceeded by the total capacity of the plurality of interconnected superchannels. Additionally, to simplify certain aspects of the hardware implementation of a transmit node in the optical communication system, the baud rate or symbol rate is preferably constant with respect to the varying modulation format. Thus, in accordance with one embodiment, the number of carriers in each superchannel can be varied according to a selected modulation format in order to provide a fixed capacity data rate, for example, for each superchannel. The number of carriers is preferably selected to minimize the occupied optical bandwidth of each superchannel. In some embodiments, the modulation format or bandwidth may be varied for a select number of carriers in the superchannel to optimize the occupied optical spectrum while providing a fixed capacity data rate.

Thus, consistent with the present disclosure, in order to satisfy both network and customer demands, each superchannel can support a range of modulation formats for a select number of carriers optimally selected for desired performance, while providing a fixed capacity data rate of each superchannel. Therefore, the occupied optical bandwidth of each superchannel can vary efficiently with the selected modulation format, thus, minimizing the occupied spectral bandwidth of each superchannel. Accordingly, an efficient carrier plan in each superchannel can provide a fixed data rate that is optimized for system economy and customer needs while maximizing spectral efficiency.

Reference will now be made in detail to the present exemplary embodiments of the present disclosure, which are illustrated in the accompanying drawings. Wherever possible, the same reference numbers will be used throughout the drawings to refer to the same or like parts.

An optical communication system 100 is shown in FIG. 1a. As shown, the optical communication system 100 comprises a plurality of interconnected nodes N1 to N14 that may span across the United States, for example. Each node, e.g., N1 to N14, may enable high capacity WDM optical transport and digital add/drop flexibility for multiplexing a plurality of optical signals traversing the optical communication system 100. Optical signals are preferably grouped according to a plurality of superchannels, SC1, SC2 and SC3, for example. Each node N1 to N14 preferably uses the exemplary systems and methods discussed below to transmit and receive superchannels, SC1, SC2, and SC3, in the optical communication system 100. The exemplary systems and methods discussed below enable nodes N1 to N14 to convert optical signals received from interconnected nodes to the electrical domain for processing and then convert the electrical signals back into optical signals for forwarding to other interconnected nodes. Thus, key network functions in each node N1 to N14 are enabled by electronic components and processes, not complex optical components. Accordingly, the optical bandwidth attendant with a node can, therefore, be easily and effectively managed to maximize service flexibility, enable rapid network reconfigurability and simplify network engineering and operations. The exemplary optical communication system 100 can be implemented by deploying nodes, N1 to N14, anywhere in the network where access is desired. Some nodes may even be implemented, such as shown with respect to node N2 in FIG. 1a, to simply route or pass one or more superchannels, SC1, SC2 and SC3, to other nodes in the network without processing the data that is carried by the superchannels. Some exemplary systems and methods implemented in nodes, N1 to N14, are further discussed below.

Figure 2A:
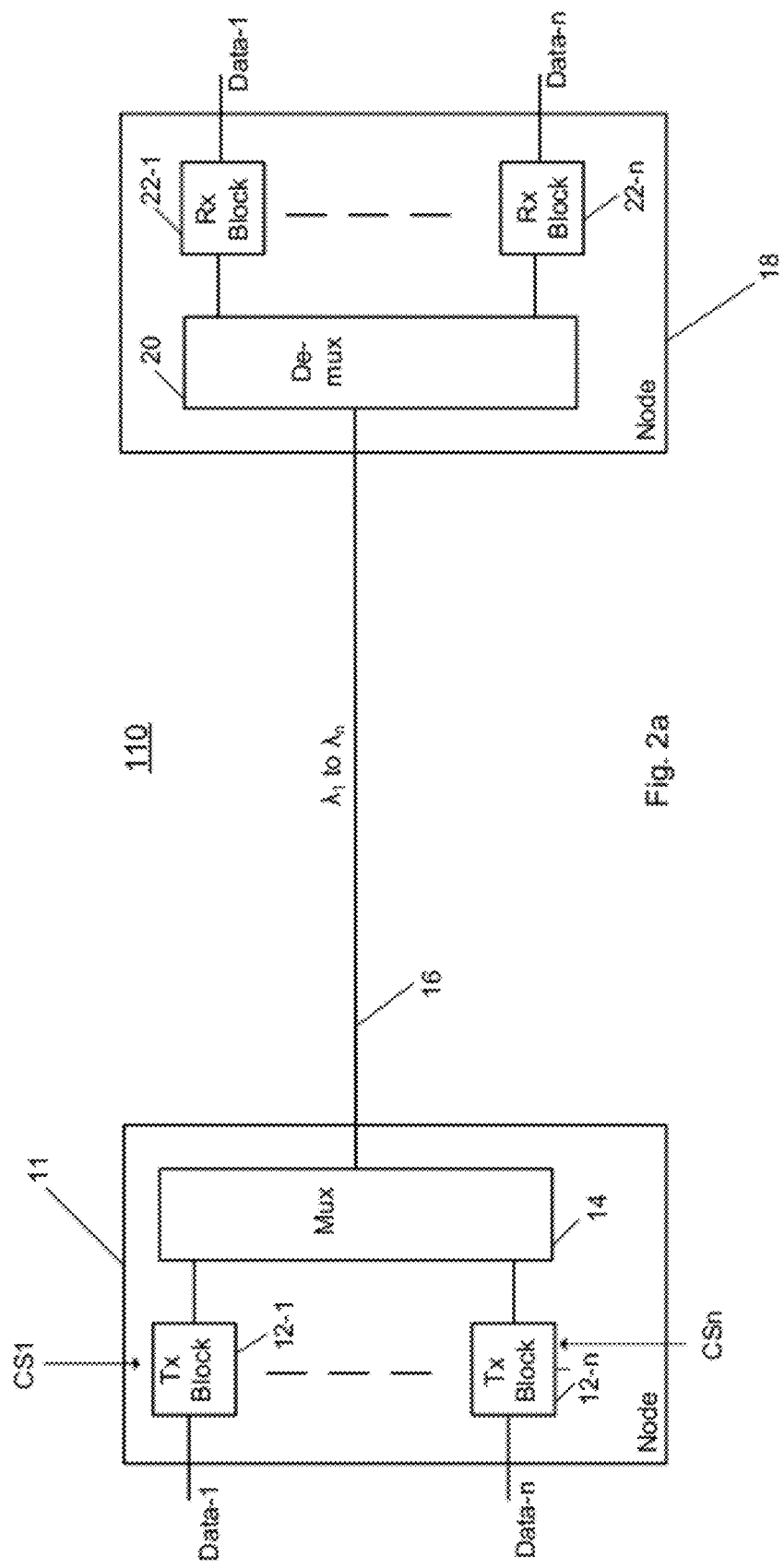
FIGS. 2*a*, 2*b* and 2*c* illustrate an optical link consistent with aspects of the present disclosure.

FIG. 2a illustrates an optical link 110 provided between a transmit node 11 and a receive node 18, such as between nodes N1 and N3, for example, as part of an optical communication system 100 consistent with an aspect of the present disclosure. Transmit node 11 (N1 in this example) may include a plurality of transmitter blocks (Tx Block) 12-1 to 12-n. The same or similar transmitter blocks may also be provided in any of remaining nodes N2 to N14. Each of transmitter blocks 12-1 to 12-n receives a corresponding one of a plurality of data or information streams, Data-1 to Data-n, and, in response to a respective one of these data streams, each of transmitter blocks 12-1 to 12-n outputs a group or band of optical signals or carriers to a combiner or multiplexer 14. Accordingly, in the exemplary embodiment, each transmitter block 12-1 to 12-n outputs a superchannel comprising a band of a plurality of sub-wavelength channels or optical carriers, as shown in FIG. 1b. Each superchannel carries an information stream or data corresponding to each of data streams Data-1 to Data-n, respectively.

The optical signals or carriers included in each group or band are centered around a wavelength specified by the International Telecommunications Union (ITU) standard. Alternatively, the band of optical signals or carriers are flexibly centered around a wavelength that optimizes an occupied spectral bandwidth of the plurality of superchannels transmitted in the optical communication system 100. As shown in FIG. 1b, a plurality of optical signals or carriers $\lambda 1,1$ to $\lambda 1,10$ are grouped or banded together to form a superchannel SC1. Each carrier $\lambda 1,1$ to $\lambda 1,10$ of SC1 may be considered a sub-wavelength channel banded around the center wavelength $\lambda 1$ identifying the superchannel SC1. As shown, in an exemplary embodiment, the plurality of sub-wavelength channels $\lambda 1,1$ to $\lambda 1,10$ are very closely or minimally spaced so as to optimize the occupied bandwidth BW1 of the superchannel SC1. In one embodiment, the plurality of carriers are spaced apart by a constant or fixed spacing. In other words, as shown in FIG. 1b, a corresponding frequency spacing between the center wavelengths $\lambda 1,1$ and $\lambda 1,2$, shown as $\Delta f$, is the same for each of the other carriers in the superchannel. Thus, each of the carriers are said to have a periodic or fixed spacing from each other by $\Delta f$. According to another embodiment, a plurality of carriers of each other superchannel may have the same or a different fixed spacing according to the specific embodiment. Furthermore, as discussed further below with respect to FIG. 11a-11c, one or more of the edge carriers may be spectrally spaced apart from an adjacent carrier by a different frequency spacing that separates the plurality of non-edge carriers.

Multiplexer 14, which in accordance with this embodiment includes one or more optical filters or broadband combiners, for example, combines each of the groups of optical signals or superchannels onto optical communication path 16. Receive node 18 is preferably provided in any of nodes N1 to N14 interconnected with a corresponding node comprising the transmit node 11, such as node N3 in this example. Optical communication path 16 includes one or more segments of optical fiber and optical amplifiers, for example, to optically amplify or boost the power of the transmitted optical signals.

Figure 2B:
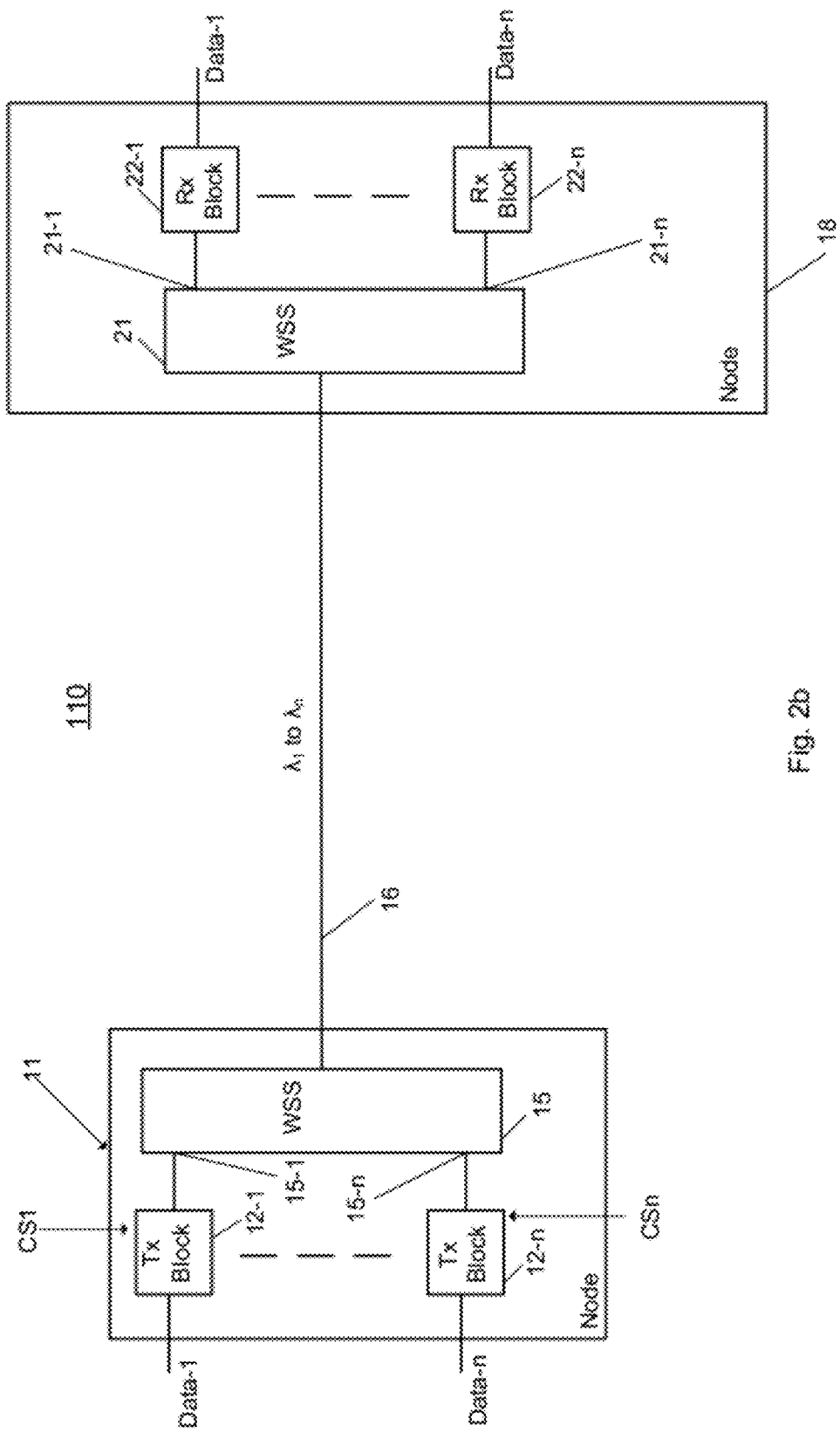

In some embodiments, demultiplexer 20 may be substituted with a programmable wavelength selective switch (WSS) 21, as shown in FIG. 2b. As generally understood, and depending on system requirements, WSS 21 may be configured to output from a first port 21-1, a first superchannel from path 16 having a wavelength within a first range or optical bandwidth and output a second superchannel with a wavelength within a second range from a second port 21-n. Consistent with the present disclosure, additional optical signals or superchannels having associated bandwidths are supplied from either one or both ports 21-1 and 21-n in order to maximize the number of optical signals or superchannels supplied from each port. WSS 21 is preferably used in a network node, N2 for example, for routing one or more superchannels between nodes N1 and N3. WSS 21 may also be used for multiplexing, adding or dropping one or more superchannels from other nodes, for example. According to some embodiments, a WSS 15 may also be substituted for the multiplexer 14 shown in FIG. 2a. WSS 15 is configured to receive at a first port 15-1 a first superchannel having a wavelength within a first range or optical bandwidth and combine it with a second superchannel having a wavelength within a second range received at a second port 15-n. The combined superchannels may then be output onto path 16.

As further shown in FIG. 2a, a receive node 18 (node N3 in this example) is provided that includes an optical decombiner or demultiplexer 20, which may include one or more optical filters, for example. Optical demultiplexer 20 supplies each superchannel or group of received optical signals to a corresponding one of receiver blocks (Rx Blocks) 22-1 to 22-n. Each of receiver blocks 22-1 to 22-n, in turn, supplies a corresponding copy of data or information streams Data-1 to Data-n in response to the optical signals. It is understood that each of transmitter blocks 12-1 to 12-n has the same or similar structure and each of receiver blocks 22-1 to 22-n has the same or similar structure.

Figure 2C:
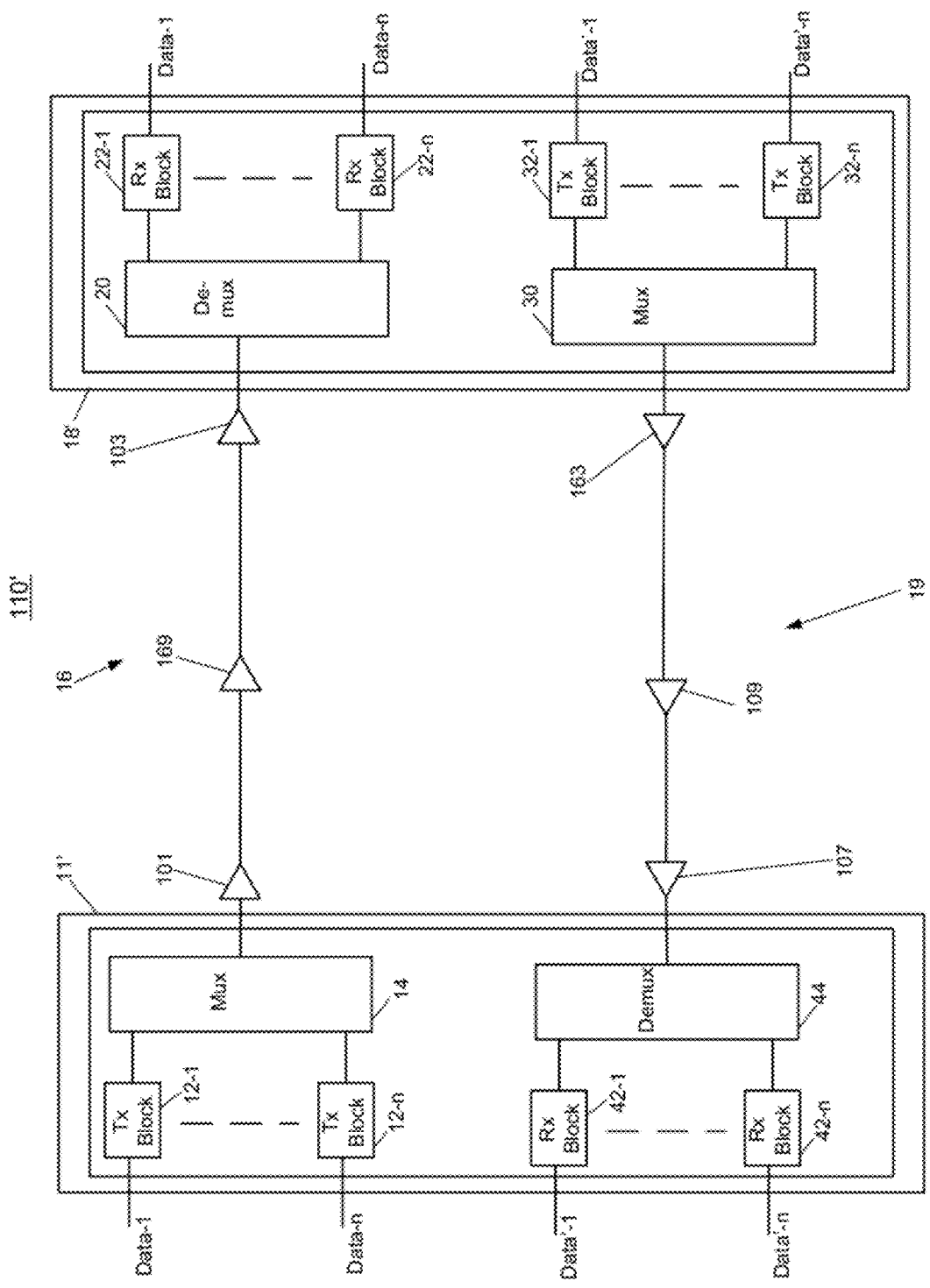

As shown in FIG. 1a, each node N1 to N14 may be interconnected with a plurality of other nodes in the optical communication system 100. Accordingly, some of nodes N1 to N14 may be configured to both transmit and receive optical signals or superchannels, SC1, SC2, and SC3, from other nodes in the optical communication system 100. FIG. 2c illustrates another exemplary embodiment of an optical link 110' consistent with the present disclosure in which a node includes both transmitter blocks and receiver blocks.

As shown in FIG. 2c, communication system 110' includes a first rack, cabinet, chassis, or housing 11', which includes a plurality of transmitter blocks (Tx Block) 12-1 to 12-n, and a plurality of receiver blocks (Rx Block) 42-1 to 42-n. Similar to the above, each of the transmitter blocks 12-1 to 12-n receives a corresponding one of a plurality of data or information streams Data-1 to Data-n, and, in response to a respective one of these data streams, each of transmitter blocks 12-1 to 12-n may output a group of optical signals or a superchannel to a combiner or multiplexer 14, which multiplexes a plurality of superchannels together onto optical communication path 16. As shown, optical communication path 16 may include one or more segments of optical fiber and optical amplifiers 101, 169, and 103, for example, to optically amplify or boost the power of the transmitted optical signals.

As further shown in FIG. 2c, the communication system 110' includes a second rack, cabinet, chassis, or housing 18', which includes a plurality of receiver blocks 22-1 to 22-n and a plurality of transmitter blocks 32-1 and 32-n. An optical combiner or demultiplexer 20 may include one or more optical filters, for example, and supply each group of received optical signals to a corresponding one of receiver blocks (Rx Blocks) 22-1 to 22-n. Each of receiver blocks 22-1 to 22-n, in turn, supplies a corresponding copy of data or information streams Data-1 to Data-n in response to the optical signals. Transmitter blocks 32-1 to 32-n and multiplexer 30 function similarly as transmitter blocks 12-1 to 12-n and multiplexer 14 provided in housing 11' in order to provide bi-directional communication via a communication path 19 between interconnected nodes N1 to N14 shown in FIG. 1a. Accordingly, receiver blocks 42-1 to 42-n and demultiplexer 44 also function similarly as receiver blocks 22-1 to 22-n and demultiplexer 20, respectively. As shown, optical communication path 19 also may include one or more segments of optical fiber and optical amplifiers 163, 109 and 107, for example, to optically amplify or boost the power of the transmitted optical signals. Further, multiplexers 14, 30 (FIG. 2c) and demultiplexers 20, 44 (FIG. 2c) may be substituted with programmable WSSs 15 and 21 (FIG. 2b), respectively.

Figure 3A:
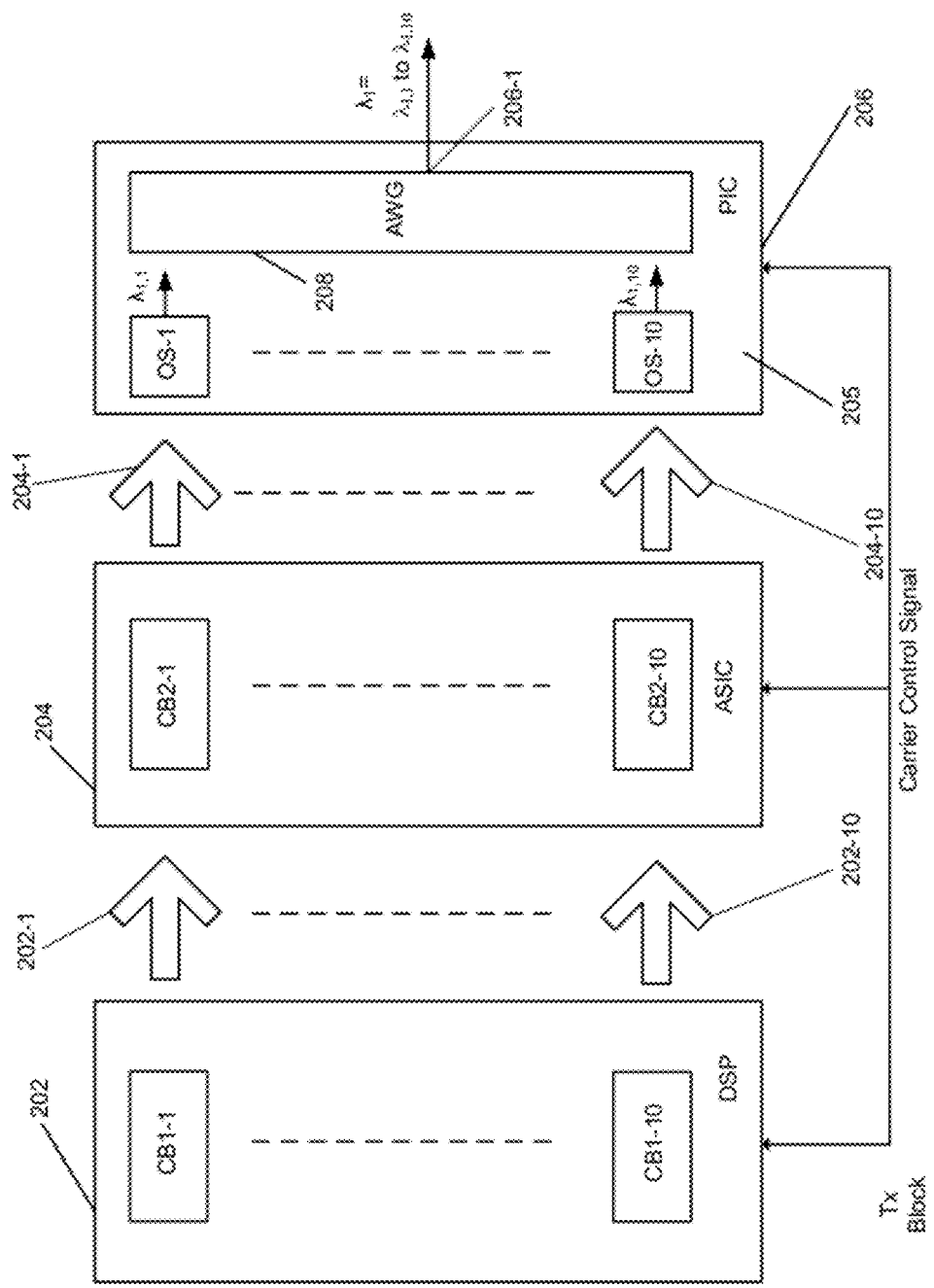
FIGS. 3*a* and 3*c* illustrate various portions of a transmitter block consistent with an additional aspect of the present disclosure.

FIG. 3a illustrates one of transmitter blocks 12-1 in greater detail. As shown, transmitter block 12-1 may include a digital signal processor (DSP) including circuitry or circuit blocks CB1-1 to CB1-10, each of which is configured for receiving, for example, a corresponding portion of Data-1 and supplying a corresponding one of outputs or electrical signals to 202-1 to 202-10 to a circuit, such as application specific integrated circuit (ASIC) 204. ASIC 204 includes circuit blocks CB2-1 to CB2-10, which supply corresponding outputs or electrical signals 204-1 to 204-10 to optical sources OS-1 to OS-10 provided on a transmit photonic integrated circuit (PIC) 206. Optical sources OS-1 to OS-10 and multiplexer 208 may be provided on substrate 205, for example. Substrate 205 may include indium phosphide or other semiconductor materials. Moreover, it is understood, that optical sources OS-1 to OS-10, as well as multiplexer 208, may be provided as discrete components, as opposed to being integrated onto substrate 205 as PIC 206. Alternatively, selected components may be provided on a first substrate while others may be provided on one or more additional substrates in a hybrid scheme in which the components are neither integrated onto one substrate nor provided as discrete devices.

As further shown in FIG. 3a, each of optical sources OS-1 to OS-10 supplies a corresponding one of modulated sub-wavelength optical signals or carriers having wavelengths $\lambda 1,1$ to $\lambda 1,10$, respectively. As discussed further below with respect to FIG. 5, in one embodiment, the modulated sub-wavelength optical signals output from OS-1 to OS-10 may be polarization multiplexed. The polarization multiplexed optical signals may then be combined by a wavelength multiplexer 208, such as an arrayed waveguide grating (AWG), for example, into a band or group of optical signals comprising a superchannel represented by $\lambda 1$ supplied by output 206-1, see also FIG. 1b. Alternatively, a broadband optical combiner may be implemented as the multiplexer 208 to combine the plurality of carriers. Because the modulated sub-wavelength optical signals are very closely or minimally spaced, however, such broadband combining may result in unacceptable degradations in transmitter signal to noise ratio (SNR).

Figure 3B:
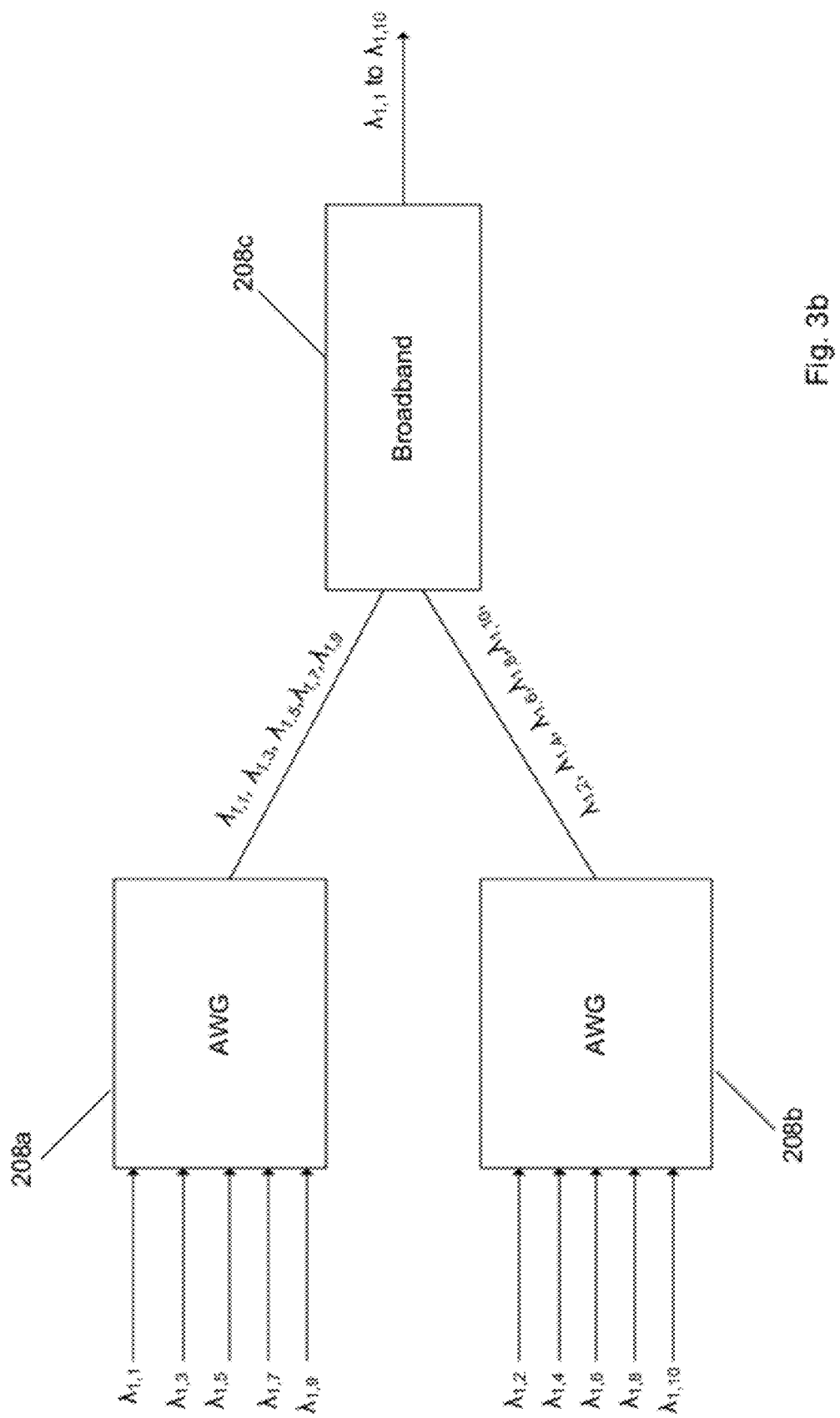
FIG. 3*b* illustrates a block diagram of a multiplexer arrangement consistent with an aspect of the present disclosure.

Accordingly, in an exemplary embodiment, multiplexer 208 preferably includes a plurality of optical filters, the outputs of which may be combined by a broadband combiner. For example, as shown in FIG. 3b, a first optical filter 208a may be provided to combine odd numbered carriers (e.g. $\lambda 1,1$, $\lambda 1,3$, $\lambda 1,5$ etc.), or every other carrier, and a second optical filter 208b may be provided to combine the even numbered carriers (e.g. $\lambda 1,2$, $\lambda 1,4$, $\lambda 1,6$ etc.) positioned between the odd numbered carriers. The first and second optical filters 208a and 208b preferably have the same frequency response, with the response of filter 208b being shifted with respect to the response of filter 208a such that the response of the second filter 208b falls interstitial to the response of filter 208a. The outputs of the first and second filters 208a, 208b may then be followed by a broadband combiner 208c to combine each of the carriers to form a superchannel of wavelength λ1 that includes each of the carriers λ1,1 to λ1,10. Alternatively, the plurality of carriers can first be filtered by four filters which are then combined using a 4-way broadband combiner. It is understood that any combination or configuration of filters and combiners may be utilized in the exemplary embodiments, so long as the frequency response of the combined filters is such that there is minimal "roll-off" between adjacent carrier frequencies, such that the minimally spaced carriers can be reliably demodulated at a receive node. Additionally, in one embodiment, a single filter can be configured to provide a frequency response similar to that of the plurality of filters shown in FIG. 3b.

Although FIG. 3a illustrates ten circuit blocks CB1-1 to CB1-10, ten circuit blocks CB2-1 to CB2-10, and ten optical sources OS-1 to OS-10, it is understood that any appropriate number of such circuit blocks and optical sources may be provided. For example, the appropriate number of circuit blocks is determined according to the number of sub-wavelength carriers utilized in accordance with a selected modulation format and symbol rate for each carrier of the superchannel, as will be discussed further below.

Figure 3C:
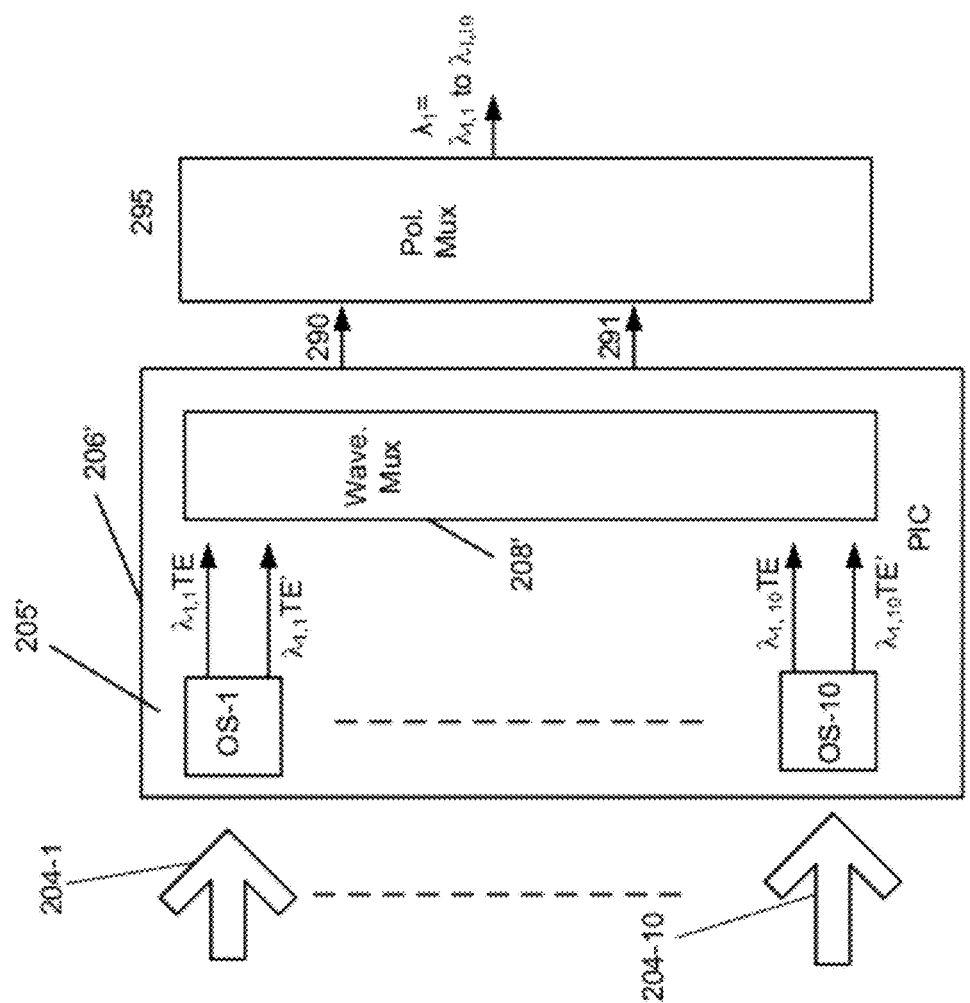

FIG. 3c illustrates an alternative embodiment of a PIC 206' according to one aspect of the present disclosure. As further shown in FIG. 3c, each of optical sources OS-1 to OS-10 may supply a corresponding pair of modulated optical signals (for example, a respective one of pairs λ1,1TE, λ1,1TE' . . . λ1,10TE, λ1,10TE') to wavelength multiplexing circuitry 208'. Typically, each optical signal within a given pair has the same or substantially the same wavelength, e.g., each of optical signals λ1,1TE and λ1,1TE' have wavelength λ1,1. In one example, each of optical signals λ1,1TE to λ1,10TE are multiplexed by wavelength multiplexing circuitry 208' into a first WDM output 290 and each of optical signals λ1,1TE' to λ1,10TE' are multiplexed into a second WDM output 291. Wavelength multiplexing circuitry 208' may include one or more arrayed waveguide gratings (AWGs) and/or one or more broadband power combiners.

The first (290) and second (291) WDM outputs may be provided to polarization multiplexing circuitry 295, including for example a polarization beam combiner. In one example, first WDM output 290 may have a transverse electric (TE) polarization and is supplied to polarization multiplexing circuitry 295 by polarization maintaining optical fiber, such that the polarization of each optical signal in the first WDM output 290 has the TE polarization upon input to polarization multiplexing circuitry 295. The second WDM output 291 may also have a TE polarization when output from wavelength multiplexer 208', but the second WDM output 291 may be provided to a second polarization maintaining fiber that is twisted in such a way that the polarization of each optical signal in the second WDM output 291 is rotated, for example, by 90 degrees. Accordingly, each such optical signal may have a transverse magnetic (TM) polarization when supplied to polarization multiplexing circuitry 295. Polarization multiplexing circuitry 295, in turn, combines the two WDM optical outputs to provide a polarization multiplexed WDM optical signal or superchannel of wavelength λ1 that includes carriers λ1,1 to λ1,10.

The above functionality of PIC 206', shown in FIG. 3c, is described in greater detail in U.S. patent application Ser. No. 12/981,835, titled "Method and Apparatus For Local Optimization of an Optical Transmitter", filed Dec. 30, 2010, the entire contents of which are incorporated herein by reference.

Figure 4:
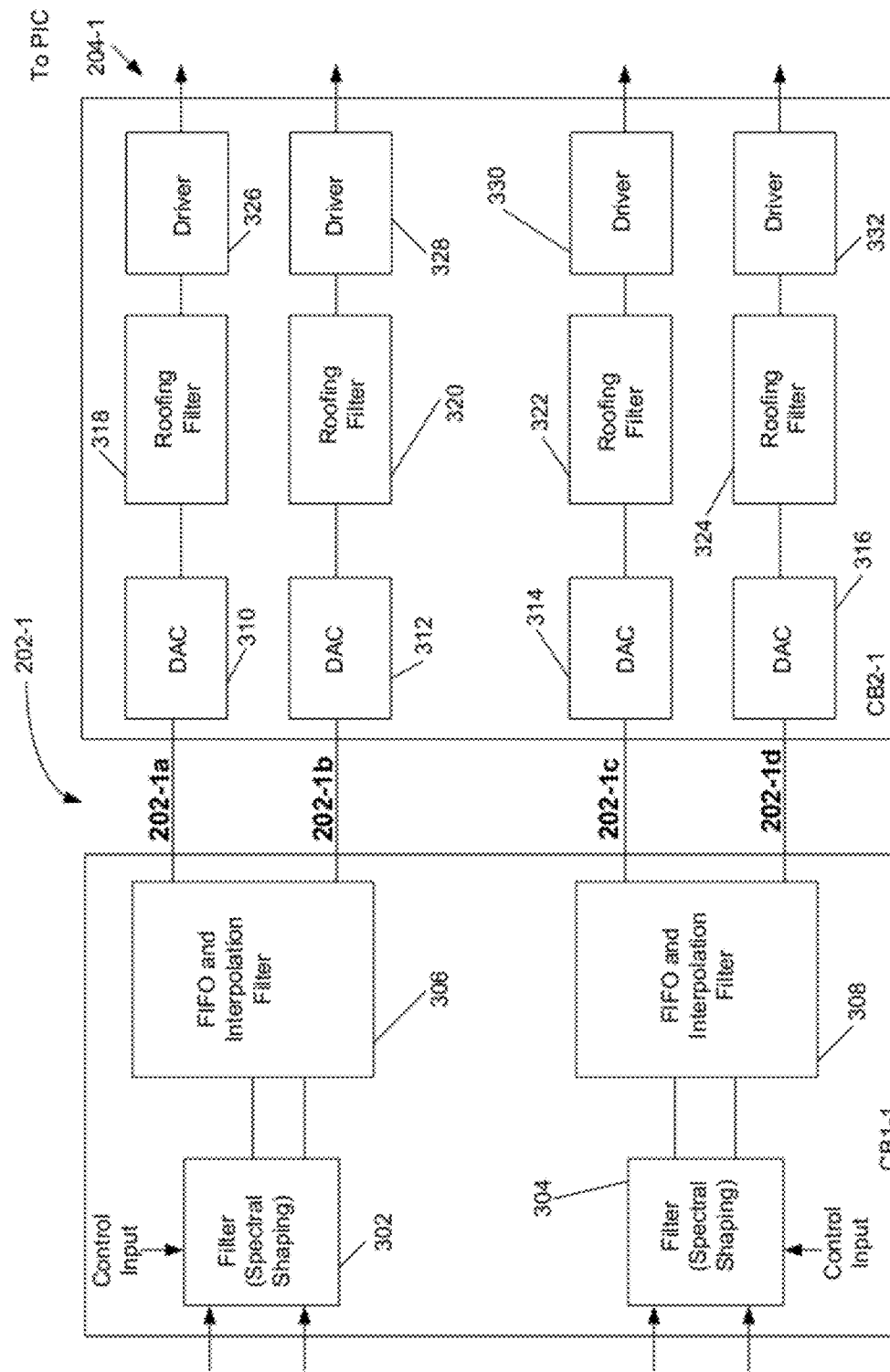
FIG. 4 illustrates a portion of the transmitter block shown in FIGS. 3*a* and 3*c* in further detail consistent with an aspect of the present disclosure.

FIG. 4 illustrates circuit block CB1-1 of DSP 202 and circuit block CB2-1 of ASIC 204 in greater detail. First portions of Data-1 may be processed within DSP circuitry 202 (also referred to as "DSP" herein) and supplied to additional circuitry, such as digital filter 302, while second portions of Data-1 may be processed within DSP 202 and supplied to digital filter 304. Digital filters 302 and 304 operate such that modulated optical signals supplied by optical source OS-1, for example, have a desired spectral shape or bandwidth. Such spectral shaping is desirable in order to reduce interference with an adjacent channel, as noted above. In one example, DSP 202 and filters 302 and 304 operate on samples ("first samples") of the first and second data portions at a given first sample or sampling rate or data rate. Digital filters 302 and 304 include known raised-cosine filters implemented with a Fast Fourier Transform (FFT). In addition, as generally understood, digital filters 302 and 304 have an associated "roll-off" factor ($\alpha$). Consistent with the present disclosure, however, such "roll-off" is adjustable or changed in response to different control inputs to filters 302 and 304. Such adjustable roll-off results in digital filters 302 and 304 having a variable or tunable bandwidth. It is understood that the control inputs may be any appropriate signal, information, or data that is supplied to filters 302 and 304, such that the "roll-off" is changed in response to such signal, information or data.

The filtered outputs (electrical signals) or filtered data supplied from filters 302 and 304 are supplied to FIFO and interpolation filter (circuit) blocks 306 and 308. As discussed in greater detail below, these circuit blocks interpolate the first samples and output second samples of the filtered data at a second sampling or data rate, which is typically higher than the first sampling rate or data rate. FIFO and interpolation filter 306 outputs data samples 202-1a and data samples 202-1b to DACs 310 and 312, respectively, and FIFO and interpolation filter 308 outputs samples 202-1c and 202-1d to DACs 314 and 316, respectively.

Detailed functionality and configuration of FIFO and interpolation filter (circuit) blocks 306 and 308 and other functionality of transmit node 11 and receive node 18 are described in greater detail in U.S. patent application Ser. No. 12/897,784, titled "Wavelength Division Multiplexed Optical Communication System Having Variable Channel Spacings", filed Oct. 5, 2010, and U.S. patent application Ser. No. 12/981,835, referenced above, the entire contents of each of which are incorporated herein by reference.

DACs 310 and 312 output corresponding analog signals in response to output data samples 202-1a and 202-1b from circuit 306, and DACs 314 and 316 output corresponding analog signals in response to samples 202-1c and 202-1d received from circuit 308. The analog signals output from DACs 310 and 312 are filtered by low-pass or roofing filters 318 and 320 to thereby remove, block or substantially attenuate higher frequency components in these analog signals. Such high frequency components or harmonics are associated with sampling performed by DACs 310 and 312 and are attributable to known "aliasing." The analog signal output from DACs 314 and 316 are similarly filtered by roofing filters 322 and 324. The filtered analog signals output from roofing filters 318, 320, 322, and 324 may next be fed to corresponding driver circuits 326, 328, 330, and 332, which supply modulator driver signals that have a desired current and/or voltage for driving modulators present in PIC 206, as discussed in greater detail below with reference to FIG. 5.

Figure 5:
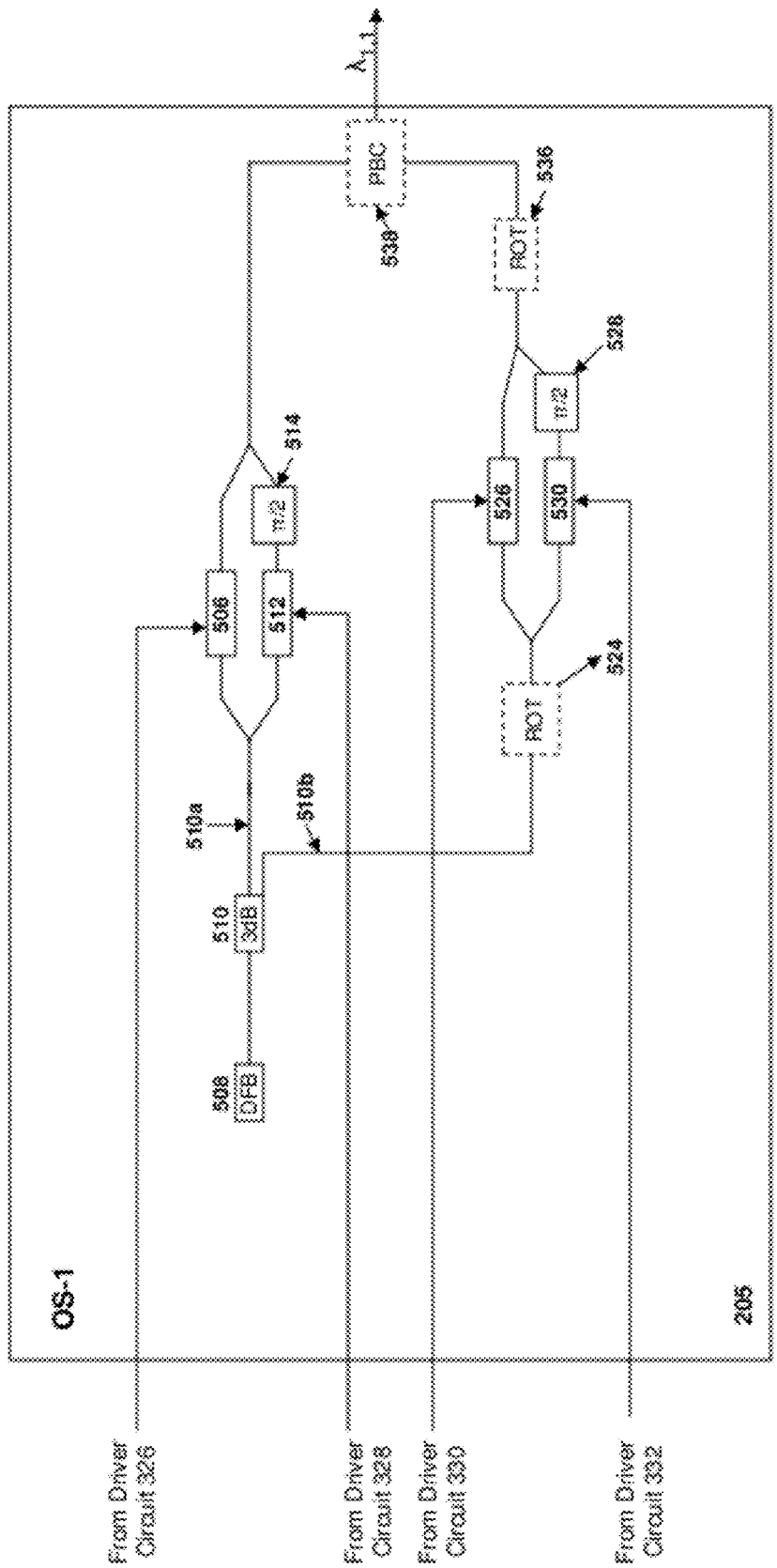
FIG. 5 illustrates a portion of a transmitter photonic integrated circuit (PIC) consistent with the present disclosure.

FIG. 5 illustrates optical source OS-1 in greater detail. It is understood that remaining optical sources OS-2 to OS-10 have the same or similar structure as optical source OS-1.

Optical source OS-1 is preferably provided on substrate 205 and includes a laser 508, such as a distributed feedback laser (DFB) that supplies light to at least four (4) modulators 506, 512, 526 and 530. DFB 508 outputs continuous wave (CW) light at wavelength $\lambda 1,1$ to a dual output splitter or coupler 510 (e.g. a 3 db coupler) having an input port and first and second output ports 510a and 510b. Typically, the various components of optical source OS-1 are connected using waveguides that may be polarization dependent. A first output 510a of coupler 510 supplies the CW light to modulator 506 and modulator 512. Similarly, the second output 510b is coupled to modulator 526 and modulator 530. Modulators 506, 512, 526 and 530 are, for example, Mach Zender (MZ) modulators. Each of the MZ modulators receives CW light from DFB 508 and splits the light between two (2) arms or paths. An applied electric field in one or both paths of a MZ modulator creates a change in the refractive index such that a phase of light output from the MZ modulator is shifted or changed relative to light input to the MZ modulator. Thus, appropriate changes in the electric field based on drive signals provided from driver circuits 326, 328, 330 and 332 can cause the desired changes in phase of the light output from the respective MZ modulators. In accordance with a desired embodiment, driver circuits 326, 328, 330 and 332 are enabled to control modulators 506, 512, 526 and 530 to modulate the incoming light from DFB 508 according to a plurality of modulation formats such as polarization multiplexed phase shift keyed (PM-QPSK), and other quadrature amplitude modulation (QAM) formats, such as PM-8QAM, PM-16QAM or PM-32QAM.

The modulated optical signal from MZ modulator 512 is supplied to phase shifter 514 which shifts the phase of the signal 90° ($\pi/2$) to generate one of an in-phase (I) or quadrature (Q) components. The signal output from phase shifter 514 is combined with the modulated data signals from MZ modulator 506, which includes the other of the I and Q components. Similarly, MZ modulator 526 outputs modulated optical signals as one of the I and Q components, whereas MZ modulator 530 outputs the other of the I and Q components from phase shifter 528 which shifts the phase of the incoming signal 90° ($\pi/2$). A polarization rotator 524 may optionally be disposed between coupler 510 and modulators 526, 530. Polarization rotator 524 may be a two port device that rotates the polarization of light propagating through the device by a particular angle, usually an odd multiple of 90°. Alternatively, polarization rotator 536 may be disposed at the combined output of modulators 526, 530 as shown. In that case, the polarization rotator 536 rotates both the modulated signals from MZ modulators 526 and 530 rather than the CW signal from DFB 508 before modulation.

In one embodiment, such as that shown in FIG. 3a for example, the combined modulated data signal from MZ modulators 526 and 530 are supplied to an input of a polarization beam combiner (PBC) 538, which combines or polarization multiplexes the two modulated signals from MZ modulators 526 and 530 with the other two modulated signals from MZ modulators 506 and 512, and outputs a polarization multiplexed optical signal having wavelength $\lambda 1,1$. In this manner, one DFB laser 508 may provide a CW signal to four separate MZ modulators 506, 512, 526 and 530 for modulating the sub-wavelength channel by utilizing phase shifting and polarization rotation of the transmission signals. Alternatively, multiple CW light sources may be used for each modulator which may increase device complexity, chip real estate, power requirements and associated manufacturing costs. Additional functionality and alternative embodiments of OS-1 consistent with the present disclosure are further described in the above incorporated U.S. patent application Ser. Nos. 12/897,784 and 12/981,835.

The polarization multiplexed output from PBC 538, may be supplied to multiplexer or AWG 208 in FIG. 3a, along with the polarization multiplexed outputs having wavelength $\lambda 1,2$ to $\lambda 1,n$ from remaining optical sources OS-2 to OS-n. Multiplexer 208, which, as noted above, may include an AWG, supplies a group of optical signals to multiplexer 14 (see FIG. 2a). Alternatively, as discussed with respect to FIG. 3c, the outputs of OS-1 to OS-n may first be multiplexed using a wavelength multiplexer or AWG 208' provided on PIC 206' and then polarization multiplexed off the PIC 206' using polarization multiplexing circuitry 295. It is understood that a PIC 206 or 206' present in each of transmitter blocks 12-2 to 12-n operates in a similar fashion and includes similar structure as PIC 206 and 206' as discussed above and shown with respect to FIGS. 3a, 3c and 5.

The above embodiments in which PIC 206 includes a plurality of optical sources OS-1 to OS-n provided on a substrate 205, enable the exemplary embodiments to spectrally space the sub-wavelength carriers $\lambda 1,1$ to $\lambda 1,10$ closely together for each superchannel. The number of carriers for each superchannel may vary according to a specific embodiment, yet it is preferred that the spacing between each carrier is optimized regardless of the number of carriers. Maintaining optimum or minimum spacing between each of the carriers depends in part on the stability of the DFB lasers 508 provided for each optical source OS-n as well as the tenability of the spectral shaping filters 302, 304 and 830, 832 in the transmit node 11 and the receive node 18, respectively. It is understood that environmental conditions, particularly changes in temperature, can seriously affect the stability of a DFB laser. Because the plurality of DFB lasers 508 are provided on a single PIC 206 as part of each optical source OS-n, the environmental conditions for each optical source OS-n can be tightly controlled. Thus, the DFB lasers 508 can be stabilized such that they can precisely output light signals at the desired closely spaced sub-wavelengths for optimizing the bandwidth of the superchannel while enabling reliable detection at a receive node 18. In one embodiment, the DFB lasers 508 can be controlled to output light signals at such minimally spaced sub-wavelengths using an etalon based wavelength locker, for example, or another wavelength technique as described in greater detail in U.S. Patent application Ser. No. 13/078,890 titled "Apparatus to Control Carrier Spacing in a Multi-Carrier Optical Transmitter" by John McNicol, filed on Apr. 1, 2011, the entire contents of which are incorporated herein by reference.

As noted above, the optical signals or superchannel $\lambda 1$ output from transmitter block 12-1 are combined with optical signals or superchannels $\lambda 2$ to $\lambda n$ output from remaining transmitter blocks 12-2 to 12-n onto optical communication path 16 and transmitted to receive node 18 (see FIG. 2a). In receive node 18, demultiplexer 20, for example, divides the incoming signals into optical signal groupings or superchannels $\lambda 1$ to $\lambda n$, such that each superchannel is fed to a corresponding one of receiver blocks 22-1 to 22-n. As discussed above, the superchannels $\lambda 1$ to $\lambda n$ are preferably spaced apart by a specified spectral bandwidth or guard band (GB1 and GB2 shown in FIG. 1b) that enables accurate demultiplexing of the superchannels using an optical demultiplexer 20 or a wavelength selective switch WSS 21 shown in FIG. 2b.

Figure 6:
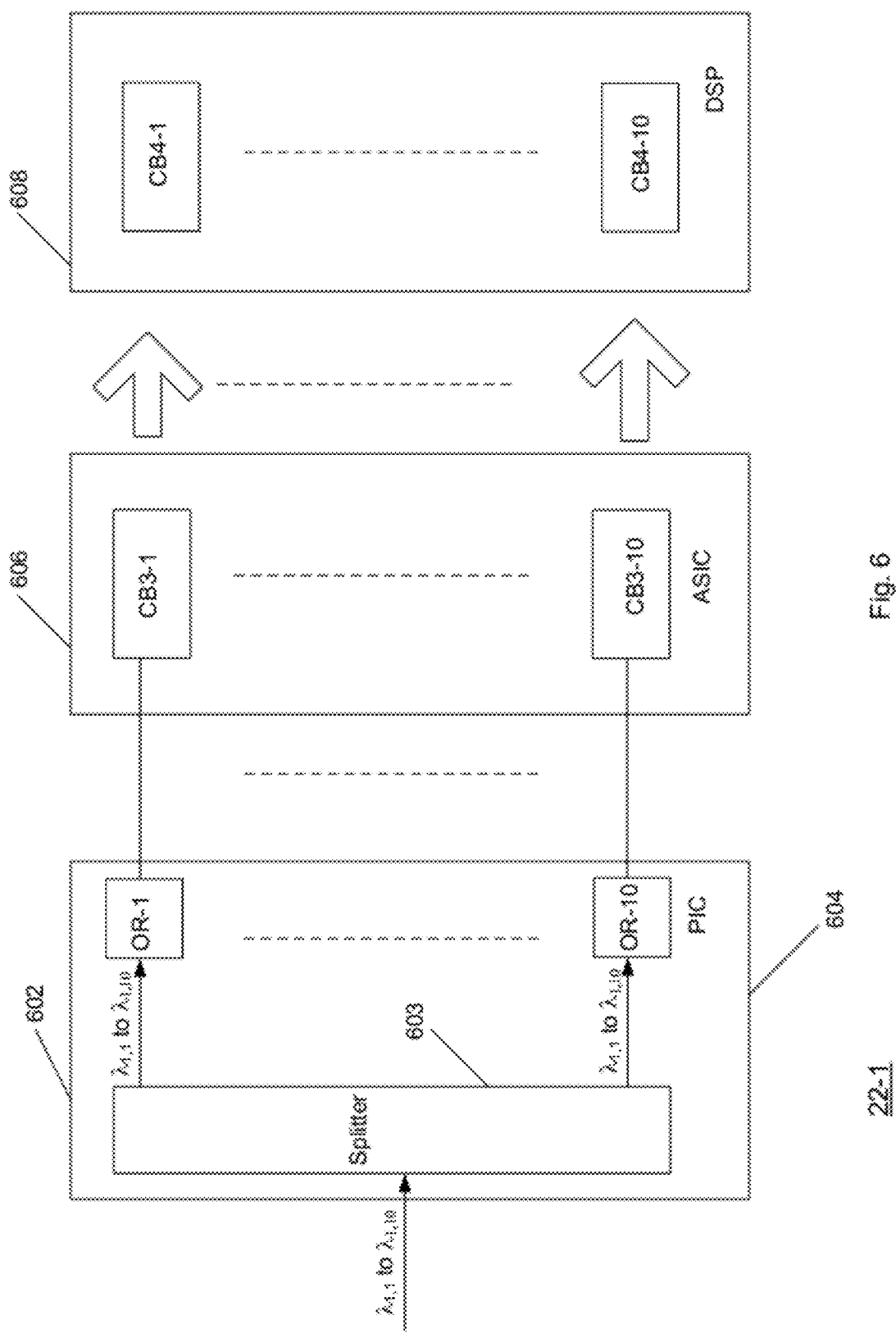
FIG. 6 illustrates a receiver block consistent with an aspect of the present disclosure.

One of receiver blocks 22-1 is shown in greater detail in FIG. 6. It is understood that remaining receiver circuitry or blocks 22-2 to 22-$n$ have the same or similar structure as receiver block 22-1.

Receiver block 22-1 includes a receive PIC 602 provided on substrate 604. PIC 602 includes an optical power splitter 603 that receives a band of optical signals having wavelengths $\lambda 1,1$ to $\lambda 1,10$, centered around $\lambda 1$ for example, and supplies a power split portion of each optical signal (each of which itself may be considered an optical signal) to each of optical receivers OR-1 to OR-10. Each optical receiver OR-1 to OR-10, in turn, supplies a corresponding output to a respective one of circuit blocks CB3-1 to CB3-10 of ASIC 606, and each of circuit blocks CB3-1 to CB3-10, supplies a respective output to a corresponding one of circuit blocks CB4-1 to CB4-10 of DSP 608. DSP 608, in turn, outputs a copy of data Data-1 in response to the input to circuit blocks CB4-1 to CB4-10. In one embodiment, the optical power splitter 603 may be substituted with a wavelength demultiplexer, such as an AWG configured similar to the AWG multiplexer 208 provided in transmit PIC 206 shown in FIG. 3*a*, or a similar arrangement as that shown in FIG. 3*b*, to separate the individual carriers which may then be transmitted to a respective optical receiver OR-*n*.

Figure 7:
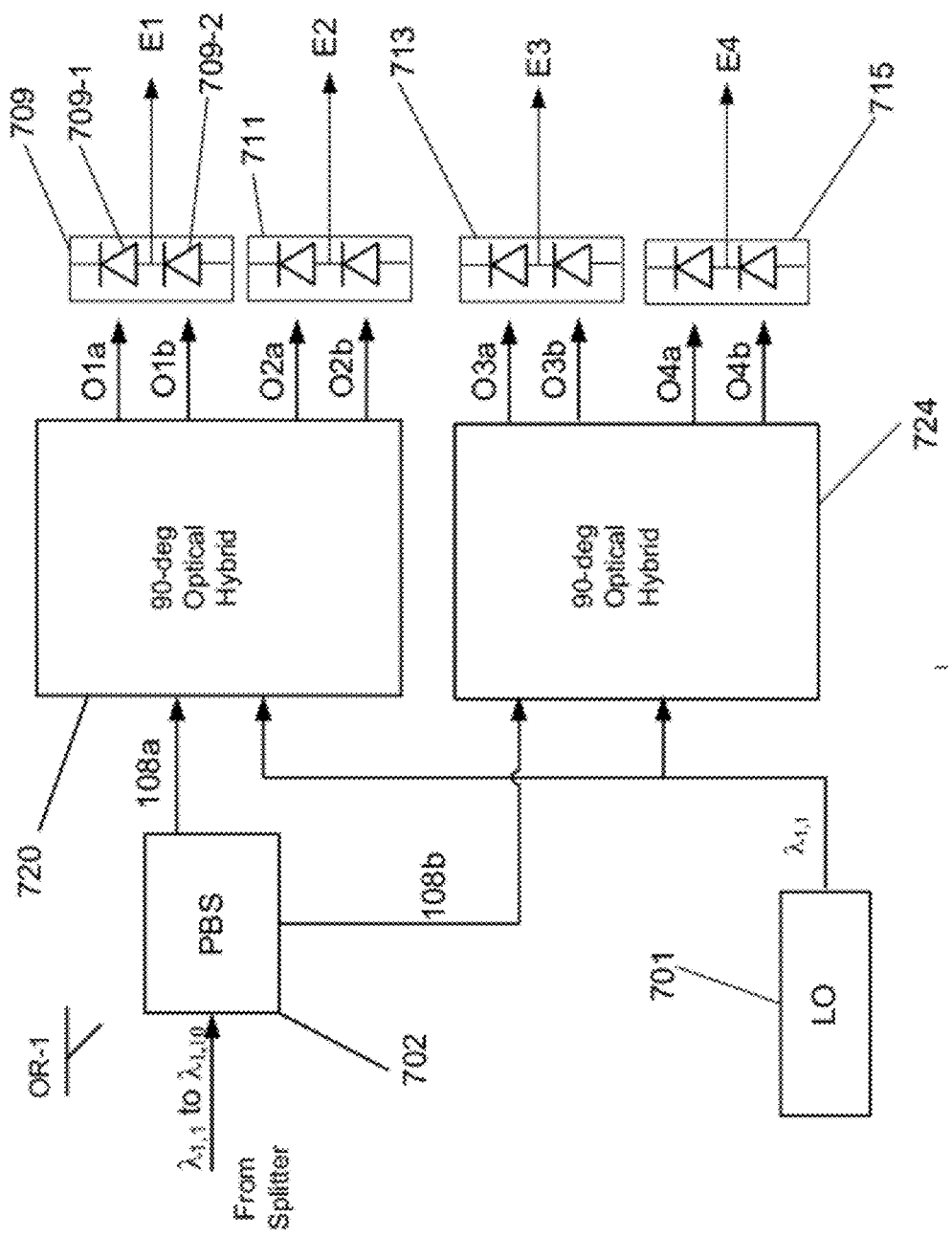
FIG. 7 illustrates a portion of a receiver photonic integrated circuit (PIC) consistent with an aspect of the present disclosure.

Optical receiver OR-1 is shown in greater detail in FIG. 7. It is understood that remaining optical receivers OR-2 to OR-10 have the same or similar structure as optical receiver OR-1. Optical receiver OR-1 may include a polarization beam splitter (PBS) 702 operable to receive polarization multiplexed optical signals $\lambda 1,1$ to $\lambda 1,10$ and to separate the signal into X and Y orthogonal polarizations, i.e., vector components of the optical E-field of the incoming optical signals transmitted on optical fiber medium 108*a* and 108*b*, respectively. The orthogonal polarizations are then mixed in 90 degree optical hybrid circuits ("hybrids") 720 and 724 with light from local oscillator (LO) laser 701 having wavelength $\lambda 1,1$. Hybrid circuit 720 outputs four optical signals O1*a*, O1*b*, O2*a*, O2*b* and hybrid circuit 724 outputs four optical signals O3*a*, O3*b*, O4*a*, and O4*b*, each representing the in-phase and quadrature components of the optical E-field on X (TE) and Y (TM) polarizations, and each including light from local oscillator 701 and light from polarization beam splitter 702. Optical signals O1*a*, O1*b*, O2*a*, O2*b*, O3*a*, O3*b*, O4*a*, and O4*b* are supplied to a respective one of photodetector circuits 709, 711, 713, and 715. Each photodetector circuit includes a pair of photodiodes (such as photodiodes 709-1 and 709-2) configured as a balanced detector, for example, and each photodetector circuit supplies a corresponding one of electrical signals E1, E2, E3, and E4. Alternatively, each photodetector may include one photodiode (such as photodiode 709-1) or a single-ended photodiode. Electrical signals E1 to E4 are indicative of data carried by optical signal of $\lambda 1,1$ as extracted by the optical hybrids 720 and 724 according to the LO 701 tuned to $\lambda 1,1$. For example, these electrical signals may comprise four base-band analog electrical signals linearly proportional to the in-phase and quadrature components of the optical E-field on X and Y polarizations. As similarly discussed with respect to the transmit PIC 206, the LO 701 of each optical receiver can be precisely tuned according to the desired sub-wavelength $\lambda 1,1$, for example, to reliably extract the sub-wavelength carrier $\lambda 1,1$ from the other densely packed sub-carrier wavelengths $\lambda 1,2$ to $\lambda 1,10$ of the received superchannel.

Figure 8:
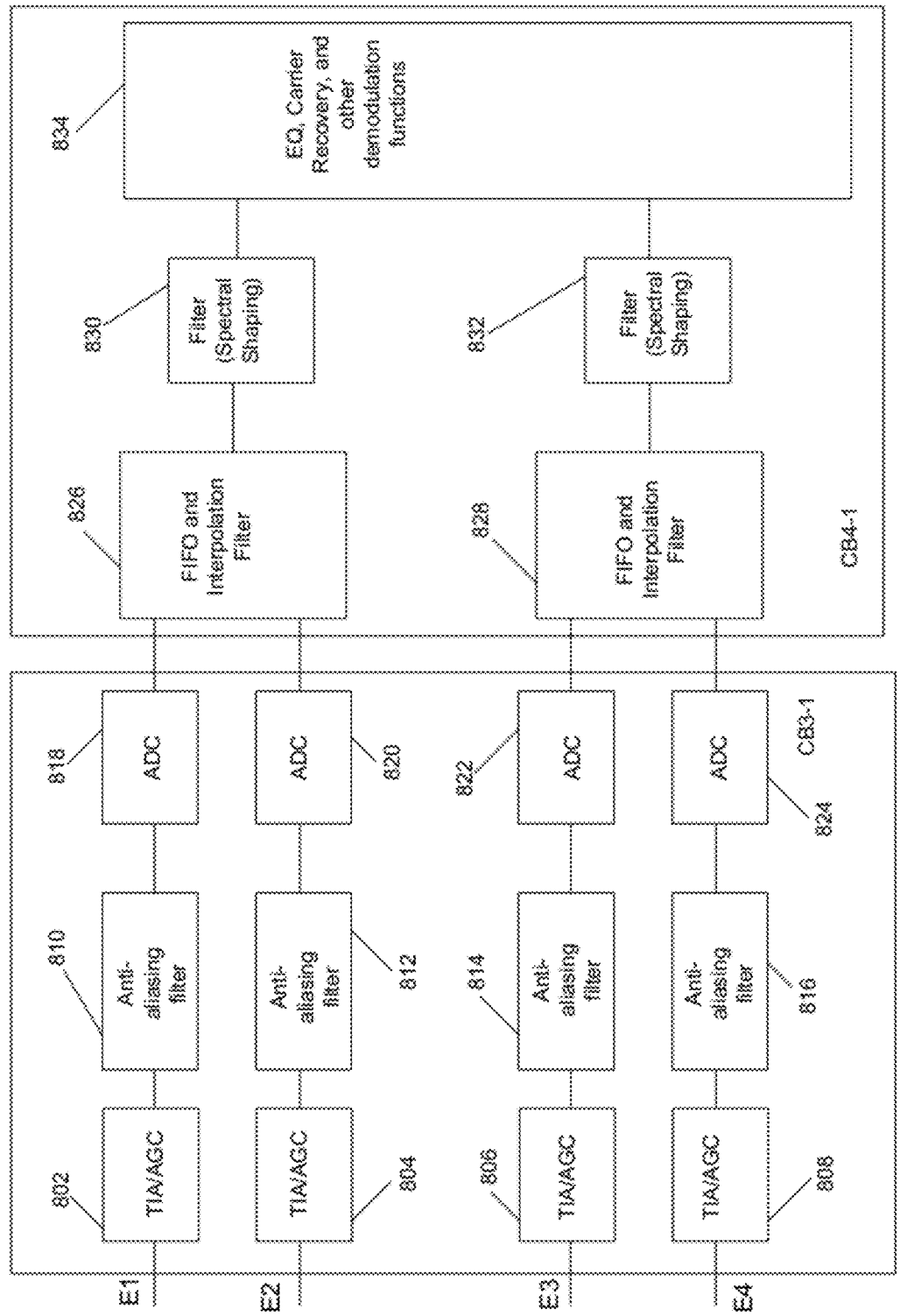
FIG. 8 illustrates a portion of the receiver block shown in FIG. 6 consistent with an aspect of the present disclosure.

FIG. 8 shows circuitry or circuit blocks CB3-1 and CB4-1 in greater detail. It is understood that remaining circuit blocks CB3-2 to CB3-10 of ASIC 606 have a similar structure and operate in a similar manner as circuit block CB3-1. In addition, it is understood that remaining circuit blocks CB4-2 to CB4-10 of DSP 608 have a similar structure and operate in a similar manner as circuit block CB4-1.

Circuit block CB3-1 includes known transimpedance amplifier and automatic gain control (TIA/AGC) circuitry 802, 804, 806, and 808 that receives a corresponding one of electrical signals E1, E2, E3, and E4. Circuitry 802, 804, 806, and 808, in turn, supplies corresponding electrical signals or outputs to respective ones of anti-aliasing filters 810, 812, 814, and 816, which constitute low pass filters that further block, suppress, or attenuate high frequency components due to known "aliasing". The electrical signals or outputs from filters 810, 812, 814, and 816 are then supplied to corresponding ones of analog-to-digital converters (ADCs) 818, 820, 822, and 824.

ADCs 818, 820, 822, and 824, may sample at the same or substantially the same sampling rate as DACs 310, 312, 314, and 316 discussed above. Preferably, however, circuit block CB4-1 and DSP 608 have an associated sampling rate that is less than the DAC sampling rate. At such a high sampling rate, DSP 608 and its associated circuitry or circuits would consume excessive power and would require a relatively complex design. Accordingly, in order to reduce the rate that samples are supplied to and processed by DSP 608, FIFO interpolation and filter circuits 826 and 828 are implemented to provide samples at a lower sampling rate than that associated with ADCs 818, 820, 822, and 824. The operation and structure of FIFO interpolation and filter circuits are described in greater detail in U.S. patent application Ser. No. 12/791,694 titled "Method, System, And Apparatus For Interpolating An Output Of An Analog-To-Digital Converter", filed Jun. 1, 2010, the entire contents of which are incorporated herein by reference.

The electrical signals or outputs of circuits 826 and 828 are provided to filters, such as digital filters 830 and 832, which may perform spectral shaping in a known manner similar to that discussed above in connection with filters 302 and 304 (see FIG. 3) to select a data stream, information stream, or data within a bandwidth associated with filters 830 and 832. Such data or information stream also corresponds to one of the optical signals, e.g., the optical signal having wavelength $\lambda 1,1$. In addition, the outputs of filter circuits 830 and 832 are next fed to processor circuitry 834 that performs equalization, carrier recovery, and other known demodulation tasks. CB4-1, as noted above, then outputs a copy of a portion of data Data-1 from receive node 18.

As noted above, because the individual carriers $\lambda 1,1$ to $\lambda 1,10$ can be separated from each other using the exemplary receiver techniques in each respective OR-*n*, the electronic or digital filters in receive node 18, such as filters 830 and 832 can electronically filter the desired data carried by each of the sub-wavelength channels (e.g. $\lambda 1,1$ to $\lambda 1,10$) of superchannel wavelength $\lambda 1$. In order to minimize errors in such data attributable to aliasing in transmit node 11, up-sampling of the data output from filters 302 and 304 is performed so that the DACs in transmit node 11 operate at a higher sampling rate than the sampling rate associated with filter 302 and 304. As a result, high frequency harmonics are spectrally spaced from the bandwidth associated with the data to be transmitted, and such harmonics can then be readily filtered by roofing filters 318 and 320, for example. Thus, upsampling in transmit node 11 may facilitate detection and electrical filtering of data carried by an optical signal without optically demultiplexing the individual sub-wavelength channels $\lambda 1,1$ to $\lambda 1,10$.

Figure 9:
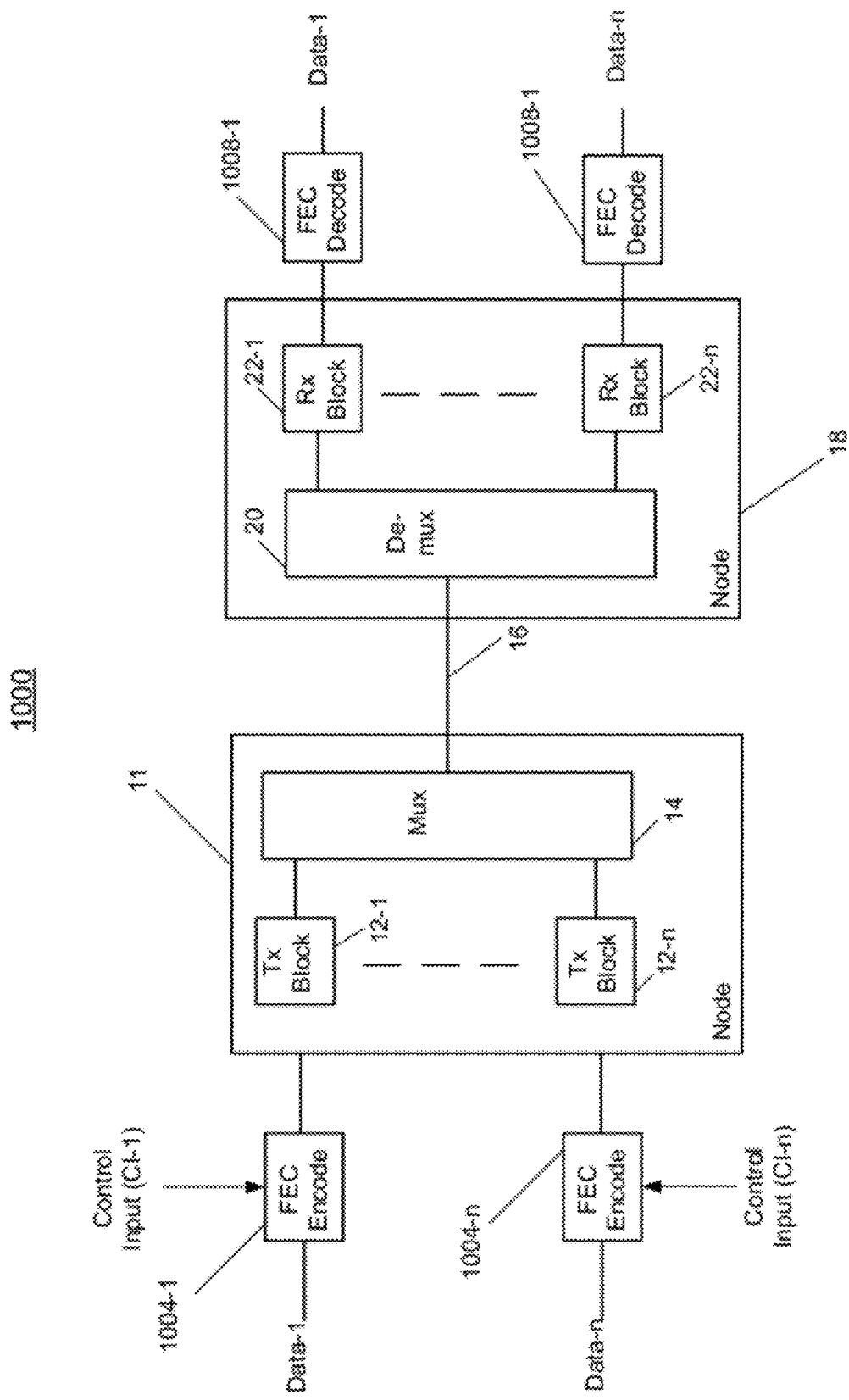
FIG. 9 illustrates an example of an optical link consistent with an additional aspect of the present disclosure.

FIG. 9 illustrates an example of an optical communication link 1000 consistent with an additional aspect of the present disclosure. Link 1000 includes forward error correction (FEC) encoder circuits 1004-1 to 1004-*n* that FEC encode data (such as Data-1 to Data-n) supplied to transmitter blocks 12-1 to 12-*n*. The additional FEC data may be combined with the transmit data as an overhead portion. Accordingly, the amount of data (payload and overhead) carried by each carrier is increased, and thus the data, symbol or baud rate associated with each carrier is also increased. After propagating through link 1000, the data carried by optical signals output from transmitter blocks 12-1 to 12-*n* is demultiplexed according to optical channel groupings in receive node 18, processed (as noted above), and then output to FEC decoder circuits 1008-1 to 1008-*n*. FEC decoder circuits 1008-1 to 1008-*n*, in turn, decode the outputs from receiver blocks 22-1 to 22-*n* to supply copies of Data-1 to Data-n.

In one example, a control input CI-1 may be supplied to FEC encoder circuit 1004-1 to adjust the amount of FEC encoding or the number of error correcting bits or bytes output therefrom and included in each carrier output from transmitter block 12-1. In addition, a different control input CI-n may be supplied to FEC encoder circuit 1004-*n* to control or adjust the number of error correcting bits or bytes output therefrom and included in each frame output from transmitter block 12-*n*. In another example, the number of error correcting bits for each carrier output from transmitter block 12-1 (as well as output from FEC encoder circuit 1004-1) may be less than the number of error correcting bits in each carrier output from transmitter block 12-*n* (as well as output from FEC encoder circuit 1004-*n*). It is understood that the control inputs may be any appropriate signal, information, or data that is supplied to the encoder circuits, such that the number of error correcting bits in each frame is changed in response to such signal, information or data.

In accordance with the above systems and methods, the optical communication system 100 shown in FIG. 1*a* can be configured to transmit a plurality of superchannels SC1, SC2 and SC3, for example, between a plurality of nodes N1 to N14 as desired. Exemplary methods for configuring a carrier plan for the superchannels SC1, SC2 and SC3 are discussed further below.

In accordance with one embodiment, the three optical signals or superchannels SC1, SC2 and SC3 shown in FIG. 1*a* may each be modulated using different modulation formats. As discussed above, the modulation format of an optical signal may be determined based on the desired reach or distance the signal is required to span or travel. For example, a lower order polarization multiplexed quadrature phase shift keyed (PM-QPSK) modulation format transmitting 4 bits per symbol, that is less susceptible to noise and filtering effects in the optical communication system 100, may be employed for the optical signal or superchannel SC1 spanning a great distance from node N1 to node N5. More complex modulation formats may utilize known higher order quadrature amplitude modulation (QAM) techniques of varying complexity according to shorter transmission distances. For example, the second superchannel SC2 spanning an intermediate distance between node N1 and node N4 may be modulated with 6 bits per symbol according to polarization multiplexed 8-QAM (PM-8QAM). Further, the third superchannel SC3 spanning the shorter distance from node N1 to node N3 may be modulated with 8 bits per symbol according to polarization multiplexed 16-QAM (PM-16QAM).

As discussed above, and as shown in FIG. 1*b*, a superchannel SC1 preferably comprises a number of minimally spaced optical carriers, such as $\lambda 1,1$ to $\lambda 1,10$. The bandwidth occupied by a single optical carrier of the superchannel is determined in part by the bit rate carried on the carrier (including overhead for framing and forward error correction), the modulation format chosen, and the pulse shaping used, as controlled by spectral shaping filters 302 and 304 discussed above in FIG. 4, for example. In one embodiment, each carrier $\lambda 1,1$ to $\lambda 1,10$ of the superchannel SC1 may be provided with a nominal bit rate of 50 Gb/s to provide an overall bit rate of 500 Gb/s. If each carrier $\lambda 1,1$ to $\lambda 1,10$ is modulated using a polarization-multiplexed QPSK modulation format and there is a 28% overhead, due to FEC bits and other framing overhead, each carrier may have a symbol rate or baud rate of 16 Gbaud. If a 10% raised-cosine pulse shaping filter, such as filter 302 and 304, is partitioned between the transmit node 11 and a receive node 18, the individual carriers $\lambda 1,1$ to $\lambda 1,10$ would each occupy approximately 17.5 GHz of optical bandwidth. Thus, the total occupied bandwidth BW1 of superchannel SC1 is approximately 175 GHz. It is understood that the total occupied bandwidth of each of the superchannels, SC1, SC2 and SC3, is dependent on the total number of carriers to be carried by the superchannel. In some embodiments, a guard band, such as GB1 or GB2 shown in FIG. 1*b* may be included, thus increasing the occupied bandwidth of the superchannel by the additional bandwidth of the guard band, 25 GHz for example.

As discussed above with respect to FIG. 1*a*, an exemplary optical communication system 100 includes a plurality of nodes N1 to N14 interconnected with each other. At any one node, a plurality of superchannels received from a plurality of other nodes may be interconnected or multiplexed. Each node is capable of add/drop multiplexing the plurality of superchannels, SC1, SC2 or SC3, as well as the carriers of each superchannel. To simplify the optical communication system and to enable the adding, dropping and multiplexing of superchannels and/or the individual carriers of each superchannel at any given node, it is preferred that each of the superchannels is configured according to a common parameter.

For example, in one embodiment, each superchannel SC1, SC2 or SC3 may be configured to occupy a constant bandwidth, such as 175 GHz as described in the above example with reference to FIG. 1*b*. In this embodiment, if the symbol rate or baud rate for each of the ten carriers $\lambda 1,1$ to $\lambda 1,10$ is fixed at 16 Gbaud, the bit rate on each carrier would vary in accordance with the modulation format employed for each of the carriers $\lambda 1,1$ to $\lambda 1,10$. For example, for polarization multiplexed binary phase shift keyed PM-BPSK, PM-QPSK, PM-8QAM and PM-16QAM, the bit rates for each carrier would be 25, 50, 75 and 100 Gb/s, respectively. To maintain a substantially constant occupied bandwidth, the number of carriers of each superchannel may be fixed to a constant number. In this example, there are ten carriers $\lambda 1,1$ to $\lambda 1,10$. Accordingly, the capacity or total bit rate of each superchannel would then scale with the modulation format, i.e. 250, 500, 750 and 1000 Gb/s, while the occupied optical bandwidth of each superchannel remains substantially fixed at 175 GHz. In the exemplary optical communication system 100 shown in FIG. 1*a*, such an embodiment, however, may result in stranded capacity and inefficient use of the optical communication system. In other words, because the data rate or capacity of each superchannel would vary with the modulation format of the individual carriers, the overall system capacity is inefficiently limited by the superchannels modulated at the lower order modulation formats (BPSK, PM-QPSK, etc). Furthermore, the multiplexing or interconnection, at a node N1 to N14 for example, of a plurality of superchannels of varying capacity may result in capacity being unused or stranded when the total data capacity of the plurality of superchannels exceeds a data capacity supported at the interconnected node. Thus, in the exemplary optical communication system 100 in which the transmitted data can be flexibly switched and interconnected with other superchannels to maximize functionality of the network 100, the non constant data throughput poses a problem.

Accordingly, in an alternative embodiment, each superchannel SC1, SC2, SC3 of the optical communication system 100, may provide a substantially fixed capacity or a constant data rate or bit rate regardless of the modulation format chosen for the carriers of each superchannel SC1, SC2, SC3. In one embodiment, to efficiently utilize the network capacity, the bandwidth occupied by each superchannel may also be varied according to the modulation format chosen, while maintaining the fixed capacity or bit rate.

Exemplary embodiments of the present disclosure are realized that generate a superchannel from one PIC 206, shown in FIGS. 3a and 3c, at data rates that can exceed 1000 Gb/s (1 Tb/s), for example. As discussed above, the advent of many data intensive applications for the Internet and their pervasive use will drive the necessity for 1 Tb/s service. While the embodiments below are disclosed with respect to achieving 1 Tb/s data rates, it should be understood that any substantially fixed capacity or constant data rate may be employed using the exemplary methods.

In one embodiment, a 16 Gbaud baud rate, sample rate or symbol rate is selected for each carrier of a superchannel. The sample rate for each carrier may be determined by the operation of the DSP block 202 and the ASIC block 204, as discussed with respect to FIG. 3a. A substantially fixed or constant baud rate is advantageous to the exemplary embodiments because, as discussed above with respect to FIG. 3a, multiplexer 208 preferably includes a fixed spacing AWG. Accordingly, because the bandwidth of the carriers preferably maintain a fixed spacing regardless of the modulation format employed, one or more fixed spacing AWGs provided in multiplexer 208 can be configured to multiplex the plurality of carriers for each of the plurality of modulation formats. From the above example, at the symbol rate of 16 Gbaud, the bit rates for each carrier may range from 50, 75 and 100 Gb/s, according to the selected modulation format of PM-QPSK, PM-8QAM and PM-16QAM, respectively. Therefore, to limit the total capacity of each superchannel, the exemplary embodiments select a number of carriers needed to limit the capacity to 1 Tb/s according to each modulation format.

Additionally, the occupied bandwidth of each superchannel should be efficiently reduced according to the number of carriers needed to realize a 1 Tb/s total capacity. For example, a superchannel employing 8QAM modulation preferably requires ⅓ less occupied bandwidth relative to a QPSK modulated superchannel, because QPSK has a modulation rate of ⅔ the number of bits per symbol as 8QAM. Accordingly, a superchannel employing 16-QAM modulation may occupy half the bandwidth of a QPSK superchannel because 16-QAM utilizes a modulation rate of twice the number of bits per symbol as does QPSK. In each of the embodiments below, the number of carriers and the bandwidth for a 16QAM modulated superchannel is preferably half of those values provided for a QPSK modulated superchannel at the same symbol rate or sample rate.

In the exemplary embodiments, a PIC 206 shown in FIG. 3a is preferably configured to support a plurality of modulation formats at a given baud rate or symbol rate. Therefore, a single PIC 206 can be configured to output a superchannel with a varying number of carriers selected according to a modulation format. Accordingly, each PIC 206 is preferably configured to support the maximum number of carriers needed to output a fixed capacity superchannel of 1 Tb/s at the lowest order modulation format supported by each PIC 206. Using the above example of a 16 Gbaud symbol rate, twenty carriers are needed to realize a 1 Tb/s capacity using the simpler lower order modulation format of PM-QPSK, as shown in FIG. 10a. Accordingly, with reference to FIG. 3a, in this embodiment a transmit block 12-n of PIC 206 is preferably configured with twenty CB1 blocks CB1-1 to CB1-20, twenty CB2 blocks CB2-1 to CB2-20, and twenty optical source blocks OS-1 to OS-20, one for each carrier $\lambda n,1$ to $\lambda n,20$. In the above example, however, a superchannel modulated according to a PM-16QAM modulation format for each carrier at 16 Gbaud, can realize a 1 Tb/s data capacity using only ten carriers, as shown in FIG. 10c.

As discussed above, in an exemplary embodiment, it is preferred that each PIC 206 is capable of supporting the number of carriers needed for each supported modulation format. Thus, for a superchannel modulated according to PM-16QAM, PIC 206 may be configured to select ten (10) carriers to be provided in the superchannel. Accordingly, as shown in FIG. 3a, a programmable carrier control signal is provided to selectively power down the DSP, ASIC and PIC components reserved for each carrier that is not utilized or activated according to the desired modulation format. Because each of the carriers are preferably minimally spaced with a fixed spacing, as shown in FIG. 1b and FIG. 10c, any adjacent ten carriers, or carriers of neighboring wavelengths with the minimal spacing, are preferably output and multiplexed in accordance with the desired placement of the superchannel block in the optical spectrum. All unused components associated with the other carriers are selectively powered down according to the carrier control signal.

In the above example, PIC 206 may be easily controlled to switch between PM-QPSK modulation and PM-16QAM modulation due to their symmetry. In another example, each carrier may be modulated according to PM-8QAM modulation format to carry a 75 Gb/s bit rate. In this case, thirteen carriers may be implemented so that the total capacity of the superchannel would only be 975 Gb/s. On the other hand, if fourteen carriers are implemented, a total capacity of 1050 Gb/s would be realized that exceeds the maximum capacity of 1000 Gb/s.

Additionally, the Optical Transport Network standard (OTN) defines a plurality of data blocks or optical data units (ODUs), similar to a frame size, for transport through an optical communications network. An 'ODU0' is defined as the basic building block for data transport and is sized to carry 1.25 Gb of data. Thus, a superchannel providing 1 Tb/s of data capacity preferably transmits 800 ODU0s (1000/1.25). In a superchannel including fourteen carriers, each modulated according to an 8QAM modulation format, the 800 ODU0s cannot be evenly distributed among the fourteen carriers.

To solve the above problems, in one embodiment utilizing PM-8QAM modulation as shown in FIG. 10b, fourteen carriers in the superchannel may be implemented whereas two of the implemented carriers may be modulated using a lower order modulation format such as PM-QPSK. For example, in this implementation the twelve PM-8QAM carriers $\lambda n,2$ to $\lambda n,13$ would provide 75 Gb/s or 60 ODU0s of data each and the two PM-QPSK carriers $\lambda n,1$ and $\lambda n,14$ would provide 50 GB/s or 40 ODU0s each for the desired total capacity of 1000 Gb/s and 800 ODU0s. One advantage of this embodiment would enable the two PM-QPSK carriers $\lambda n,1$ and $\lambda n,14$ to be positioned on the edge of the combined block of carriers, as shown. It is understood that as a superchannel, SC2 for example as shown in FIG. 1a, passes through a plurality of nodes N2 and N3 in the exemplary optical communications system 100, the superchannel SC2 may pass through a number of amplifier and filtering components, such as 101, 169 and 103 shown in FIG. 2c, that may degrade the edges of each block of the superchannel SC2 spectrum. Thus, by placing the more simply modulated or lower order modulated carriers λn,1 and λn,14 on the edges of the superchannel bandwidth spectrum, the superchannel realizes improved tolerance to such filtering effects. In this embodiment, the fourteen carriers of the superchannel occupy a combined optical bandwidth of 245 GHz (14×17.5). This occupied spectrum, however, is wider than the desired optical spectrum of 233.33 GHz, based on the relative scaling of the bandwidth with respect to PM-QPSK, 350 GHz as shown in FIG. 10a. As discussed above, it is desired that a superchannel modulated according to PM-8QAM modulation format efficiently utilizes ⅓ less bandwidth relative to a PM-QPSK modulated superchannel, because PM-QPSK has a modulation rate of ⅔ the number of bits per symbol as does PM-8QAM. Accordingly, a more efficient use of the occupied optical spectrum is desired.

Figure 11A:
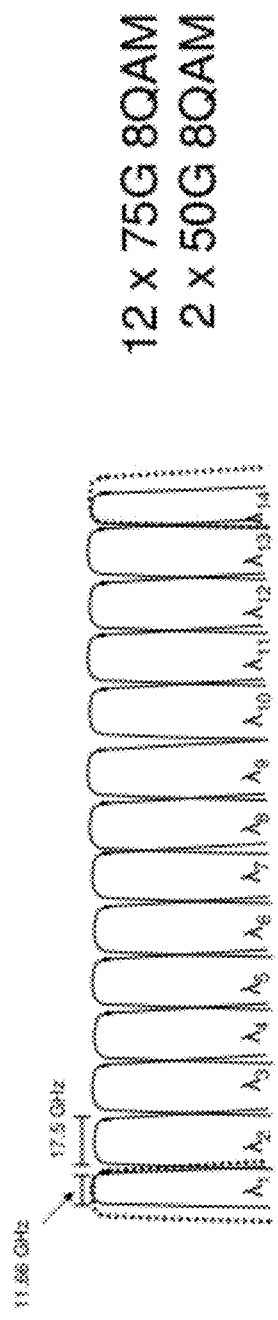
FIGS. 11*a*, 11*b* and 11*c* illustrate aspects of a carrier plan of a superchannel consistent with another aspect of the present disclosure.

According to one embodiment as shown in FIG. 11a, a more spectrally efficient approach utilizes PM-8QAM modulation for each of the fourteen carriers while reducing the baud rate or symbol rate for the edge carriers λn,1 and λn,14. In other words, the two edge carriers λn,1 and λn,14 may be modulated according to PM-8QAM, but at a lower baud rate or symbol rate, such as at ⅔ the baud rate of the other twelve carriers λn,2 to λn,13. According to this embodiment, a superchannel would occupy the minimal optical bandwidth of 233.33 GHz discussed above. For example, with twelve of the carriers occupying 17.5 GHz each and two of the carriers each occupying ⅔ of the bandwidth of the other carriers [(12+2×⅔)×17.5], the total occupied optical bandwidth of the superchannel is 233.33 GHz. Additionally, the two 8QAM carriers λn,1 and λn,14 modulated at the lower baud rate or symbol rate would transmit 50 Gb/s each, similar to the two edge carriers λn,1 and λn,14 modulated according to PM-QPSK in FIG. 10b. Accordingly, the superchannel according to this embodiment provides a 1 Tb/s data capacity (12×75+2×50) at a minimal occupied optical spectrum.

Figure 11C:
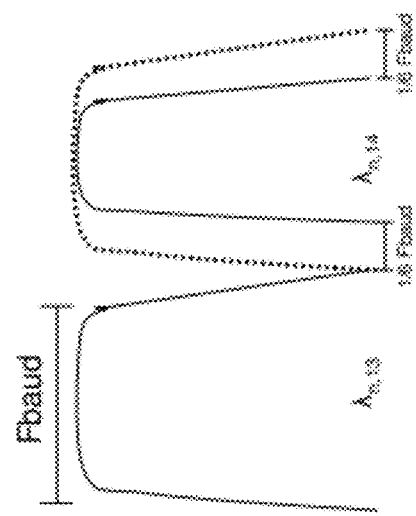
Figure 11B:
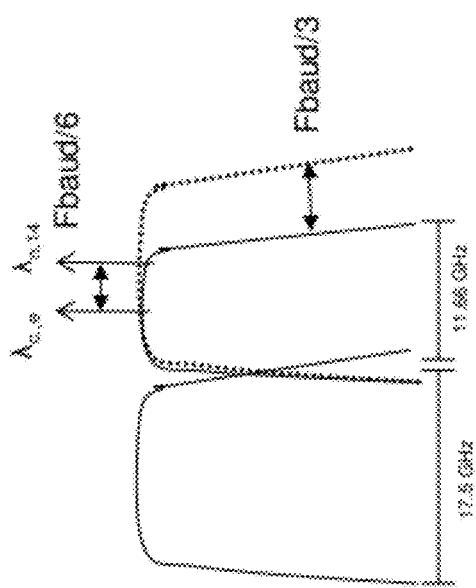

In this embodiment, as further shown in FIGS. 11a-11c, the two edge carriers λn,1 and λn,14 now occupy ⅔ of the optical bandwidth (11.66 GHz) of the other twelve carriers λn,2 to λn,13. Initially, the optical bandwidth of the two edge carriers λn,1 and λn,14 is shifted on the left and right side of the center of the bandwidth by approximately ⅙th of the full symbol rate or baud rate, Fbaud, of the other twelve carriers, as shown in FIG. 11c with respect to edge carrier λn,14. As further shown in FIG. 11c, such a shift results in unused bandwidth of ⅙$^{th}$ of the full baud rate or symbol rate between the edge carrier λn,14 and the adjacent carrier λn,13 in the superchannel. A similar unused bandwidth of ⅙$^{th}$ of the full symbol rate, Fbaud, of the other twelve carriers also occurs between the edge carrier λn, 1 and carrier λn,2, resulting in a total unused bandwidth of ⅔ the full symbol rate or 11.66 GHz in this embodiment. Accordingly, if the unused bandwidth is not corrected, the total occupied spectrum of the superchannel is not optimized.

Figure 12:
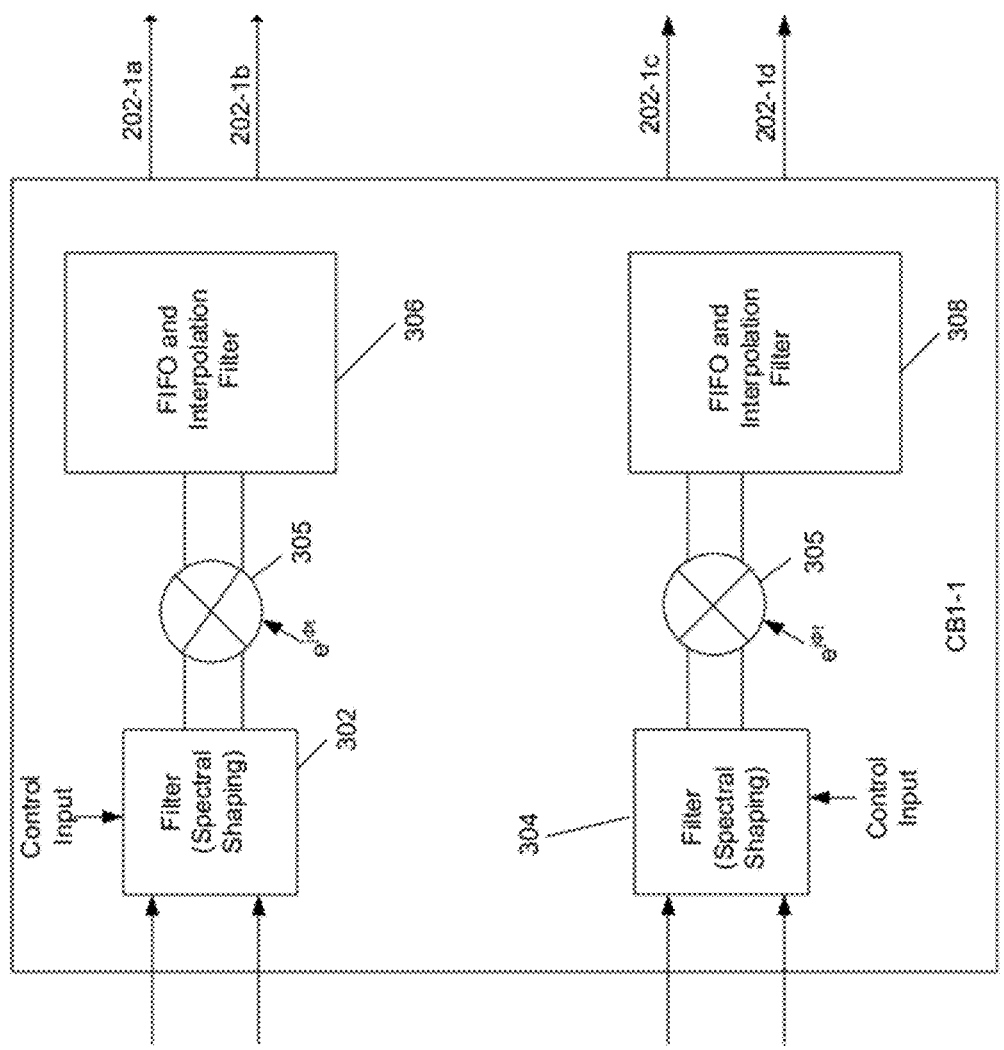
FIG. 12 illustrates an example of a portion of a transmitter block consistent with an aspect of the present disclosure.

To solve the above problem, the bandwidth of the edge carriers λn,1 and λn,14 are preferably shifted towards the center of the band of carriers as shown in FIG. 11b, so that each of the carriers λn,1 to λn,14 are minimally spaced and the occupied bandwidth of the carriers is minimized. As further shown in FIG. 11b, however, the center wavelength λce of the edge carrier λn,14 no longer aligns with the center wavelength of the full bandwidth defined by λn,14. Accordingly, the shifted edge carriers λn,1 and λn,14 no longer conform to the center bandwidth frequency of a fixed spacing combiner 208, shown in FIG. 3a, or other optical filters utilized in the PIC 206. Accordingly, in one embodiment the center of the edge carriers λn,1 and λn,14 may be shifted by re-tuning a laser source or DFB 508, as shown in FIG. 5, of the corresponding optical source OS-n in the PIC 206 by ⅙$^{th}$ of the symbol rate or baud rate to match the center frequency of the fixed spacing filter 208. The laser source may be re-tuned according to an etalon based wavelength locker, for example, or other capable method as discussed above. In another embodiment, as shown in FIG. 12, instead of re-tuning the laser 508, the I/O baseband signal can be shifted by ⅙ of the symbol rate of the other carriers by "spinning" or shifting the phase of the incoming signal according to a value Exp (j*phi*t) utilizing a multiplier 305, as shown in FIG. 12. The value of "phi" represents a phase angle of the carrier with respect to a clock signal or time 't'. The multiplier 305 may be provided between the spectral shaping filter 302, 304 and the FIFO and interpolation filter 306, 308, as shown, to shift the symbol rate by ⅙ the symbol rate of the other carriers.

In an alternative embodiment, instead of reducing the symbol rate of the two edge carriers λn,1 and λn,14 shown in FIG. 11a, an exemplary superchannel may utilize thirteen carriers providing 75 Gb/s each and one edge carrier at ⅓ the full symbol rate, Fbaud, such that the carrier provides 25 Gb/s to realize a total capacity of 1 Tb/s. Accordingly, the optical bandwidth of one of the edge carriers in this embodiment is shifted by ⅔ the symbol rate or baud rate of the other thirteen carriers.

The above embodiments are described utilizing a symbol rate or baud rate of 16 Gbaud. It is understood that the above methods and techniques may be similarly applied to other embodiments utilizing a different symbol rate. For example, if the symbol rate were doubled to 32 Gbaud, the number of carriers for each of the modulation formats would be halved. Accordingly, a superchannel utilizing PM-QPSK modulation may utilize ten carriers each providing 100 Gb/s of data. Additionally, a superchannel utilizing PM-8QAM modulation could implement six carriers each providing 150 Gb/s of data and one edge carrier of 100 Gb/s, for example, or 5 carries providing 150 Gb/s of data and two edge carriers providing 125 Gb/s of data. It is understood that at any substantially constant symbol rate or baud rate, such as 20 Gbaud, the number of carriers and data rate provided for each carrier utilizing PM-8QAM could be implemented according to the above techniques to realize a limited capacity superchannel with an optimal or minimal occupied bandwidth.

Accordingly, in view of the above embodiments, the data associated with an individual sub-wavelength carrier may be transmitted according to a variable symbol rate and modulation format. Accordingly, the exemplary transmit blocks 12-n as shown in FIG. 2a may be configured to selectively vary the symbol rate and modulation format for each of the carriers. In one embodiment, as shown in FIG. 2a, transmitter block 12-1 in response to a first control signal CS1 may output a first optical signal or superchannel λ1 modulated in accordance with a first modulation format, such as a PM-QPSK, PM-8QAM, or PM-16QAM. Moreover, in response to a second control signal CSn supplied to transmitter block 12-n, transmitter block 12-n may output a second superchannel λn modulated in accordance with a second modulation format, which may be different from the first modulation format. Additionally, in some embodiments the control signals CS1 and CSn may be capable of configuring the modulation format for select carriers output from the superchannel. Additionally, the bandwidth of each of the carriers may vary according to the selected symbol rate and modulation format, thus as shown in FIG. 3, the spectral filters 302 and 304 are also preferably controlled to variably adjust the spectral shaping of the optical signals according to an input control signal as shown in FIG. 4. Furthermore, the FIFO and Interpolation filters 306 and 308 and DAC blocks 310, 312, 314 and 316 are preferably configured to adjust the symbol rate or sample rate for select carriers of the superchannel in accordance with the above embodiments.

As further discussed above, an exemplary embodiment is capable of providing a 1 Tb/s superchannel comprising a group of minimally spaced carriers occupying a total bandwidth of 175 GHz, 233.33 GHz and 350 GHz, according to the modulation format selected for the superchannel at a substantially constant 16 Gbaud symbol rate. Such a high data rate superchannel at minimal spacing between carriers can be realized in the exemplary embodiments utilizing electrical filtering components shown in FIGS. 4 and 8 and the plurality of tightly controlled lasers 508 in FIG. 5 and 701 in FIG. 7, each provided within PIC 206 and 602, respectively. As a result, optical signals having different modulation formats, different levels of FEC encoding, and minimal carrier spacing may be transmitted over different distances and reliably detected so that system capacity may be optimized while minimizing the occupied spectral bandwidth.

Other embodiments will be apparent to those skilled in the art from consideration of the specification. It is intended that the specification and examples be considered as exemplary only, with a true scope and spirit of the invention being indicated by the following claims.

What is claimed is:

1. An apparatus, comprising:
an optical transmitter configured to supply a plurality of optical signals from a plurality of corresponding optical sources, each of the plurality of optical signals carrying a plurality of symbols at a first symbol rate and being output from a corresponding one of a plurality of modulator circuits provided in the optical transmitter, each of the plurality of optical signals being modulated in accordance with one of a plurality of modulation formats;
wherein the apparatus is configured to select a subset of the plurality of optical sources and a corresponding subset of the plurality of modulator circuits to supply a corresponding subset of the plurality of optical signals to a communication path, the subset of the plurality of optical signals being modulated according to a selected one of the plurality of modulation formats, each of which having a corresponding one of a plurality of data rates, wherein a number of the subset of the plurality of optical signals is in accordance with the selected modulation format, such that the subset of optical signals collectively provides a desired collective data rate;
an optical combiner configured to receive the subset of the plurality of optical signals and supply the subset of the plurality of optical signals to the optical communication path, wherein the optical combiner comprises a first filtering component for filtering a first subset of the plurality of first and second optical signals to provide a first filtered output, a second filtering component for filtering a second subset of the plurality of first and second optical signals to provide a second filtered output, and an optical multiplexer that combines an output of the first filtering component and an output of the second filtering component.

2. The apparatus of claim 1, further including a substrate, the plurality of optical sources being provided on the substrate.

3. The apparatus of claim 1, wherein the desired data rate is 1000 Gb/s.

4. An apparatus, comprising:
an optical transmitter configured to supply a plurality of optical signals from a plurality of corresponding optical sources, each of the plurality of optical signals carrying a plurality of symbols at a first symbol rate and being output from a corresponding one of a plurality of modulator circuits provided in the optical transmitter, each of the plurality of optical signals being modulated in accordance with one of a plurality of modulation formats;
wherein the apparatus is configured to select a subset of the plurality of optical sources and a corresponding subset of the plurality of modulator circuits to supply a corresponding subset of the plurality of optical signals to a communication path, the subset of the plurality of optical signals being modulated according to a selected one of the plurality of modulation formats, each of which having a corresponding one of a plurality of data rates, wherein a number of the subset of the plurality of optical signals is in accordance with the selected modulation format, such that the subset of optical signals collectively provides a desired collective data rate,
the apparatus being further configured to remove power from a plurality of optical sources and a group of modulator circuits not included in the selected subset of the plurality of optical sources and the said corresponding subset of the plurality of modulator circuits.

5. An apparatus, comprising:
an optical transmitter configured to supply a plurality of optical signals from a plurality of corresponding optical sources, each of the plurality of optical signals carrying a plurality of symbols at a first symbol rate and being output from a corresponding one of a plurality of modulator circuits provided in the optical transmitter, each of the plurality of optical signals being modulated in accordance with one of a plurality of modulation formats;
wherein the apparatus is configured to select a subset of the plurality of optical sources and a corresponding subset of the plurality of modulator circuits to supply a corresponding subset of the plurality of optical signals to a communication path, the subset of the plurality of optical signals being modulated according to a selected one of the plurality of modulation formats, each of which having a corresponding one of a plurality of data rates, wherein a number of the subset of the plurality of optical signals is in accordance with the selected modulation format, such that the subset of optical signals collectively provides a desired collective data rate,
wherein a number of the optical signals the optical transmitter is configured to supply corresponds to a minimum number of optical signals needed to collectively provide the desired data rate when the selected modulation format corresponds to a quadrature phase shift keyed (QPSK) modulation format.

6. The apparatus of claim 4, further including a substrate, the plurality of optical sources being provided on the substrate.

7. The apparatus of claim 4, wherein the desired data rate is 1000 Gb/s.

8. The apparatus of claim 5, further including a substrate, the plurality of optical sources being provided on the substrate.

9. The apparatus of claim 5, wherein the desired data rate is 1000 Gb/s.

10. The apparatus of claim 1, wherein the selected one of the plurality of modulation formats corresponds to an 8-QAM modulation format.

11. The apparatus of claim 7, wherein the selected one of the plurality of modulation formats corresponds to an 8-QAM modulation format.

12. The apparatus of claim 5, wherein the selected one of the plurality of modulation formats corresponds to an 8-QAM modulation format.

* * * * *